US012389186B2

(12) United States Patent
De Bruijn

(10) Patent No.: US 12,389,186 B2
(45) Date of Patent: Aug. 12, 2025

(54) AUDIO RENDERING OF AUDIO SOURCES

(71) Applicant: Telefonaktiebolaget LM Ericsson (publ), Stockholm (SE)

(72) Inventor: Werner De Bruijn, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/612,905

(22) Filed: Mar. 21, 2024

(65) Prior Publication Data

US 2024/0349002 A1 Oct. 17, 2024

Related U.S. Application Data

(60) Division of application No. 17/344,632, filed on Jun. 10, 2021, now Pat. No. 11,962,996, which is a continuation-in-part of application No. PCT/EP2020/077182, filed on Sep. 29, 2020.

(60) Provisional application No. 62/950,272, filed on Dec. 19, 2019.

(51) Int. Cl.
*H04S 7/00* (2006.01)
*G10L 25/51* (2013.01)

(52) U.S. Cl.
CPC .............. *H04S 7/303* (2013.01); *G10L 25/51* (2013.01); *H04S 7/302* (2013.01); *H04S 2400/13* (2013.01); *H04S 2420/03* (2013.01)

(58) Field of Classification Search
None
See application file for complete search history.

(56) References Cited

U.S. PATENT DOCUMENTS

| | | | |
|---|---|---|---|
| 10,349,201 | B2 | 7/2019 | Baek |
| 11,711,665 | B2 | 7/2023 | Lyren |
| 2006/0215853 | A1 | 9/2006 | Hiruma |
| 2016/0192105 | A1 | 6/2016 | Breebaart |
| 2016/0227338 | A1 | 8/2016 | Oh |
| 2023/0019535 | A1 | 1/2023 | De Bruijn |
| 2023/0094733 | A1 | 3/2023 | Audfray |

FOREIGN PATENT DOCUMENTS

| | | |
|---|---|---|
| EP | 1 868 416 | 12/2007 |
| WO | 2014/159272 | 10/2014 |
| WO | 2015/017235 | 2/2015 |
| WO | 2019/121773 | 6/2019 |

OTHER PUBLICATIONS

Non-Final Office Action in related U.S. Appl. No. 17/785,893, dated Mar. 22, 2024 (5 pages).
International Searched Report in application No. PCT/EP2020/077182 dated Feb. 4, 2021 (8 pages).

(Continued)

*Primary Examiner* — Paul W Huber
(74) *Attorney, Agent, or Firm* — Rothwell, Figg, Ernst & Manbeck, P.C.

(57) ABSTRACT

Providing a more natural, physically accurate rendering of the acoustic behavior of a volumetric audio source (e.g., a line-like audio source). In one embodiment, this is achieved by applying a parametric distance-dependent gain function in the rendering process, where the shape of the parametric gain function depends on characteristics of the volumetric audio source.

14 Claims, 14 Drawing Sheets

(56) References Cited

OTHER PUBLICATIONS

Ureda, "Pressure response of line sources," Convention Paper 5649 presented at the 113th Audio Engineering Society Convention, Los Angeles, CA, Oct. 2002 (8 pages).
Information technology—High efficiency coding and media delivery in heterogeneous environments, ISO/IEC 23008-3:201x(E) (MPEG-H), Clause 8.4.4.7 ('Spreading'), Clause 18.1 ('Divergence'), Clause 18.11 ('Diffuseness'), Oct. 12, 2016 (799 pages).

AUDIO RENDERING OF AUDIO SOURCES

CROSS-REFERENCE TO RELATED APPLICATION

This application is divisional of U.S. patent application Ser. No. 17/344,632, filed on 2021 Jun. 10 (now U.S. Pat. No. 11,962,996, issued on 2024 Apr. 16), which is a continuation-in-part of International Patent Application No. PCT/EP2020/077182, filed on 2020 Sep. 29, which claims priority to U.S. Provisional Patent Application No. 62/950,272, filed on 2019 Dec. 19. The above identified applications and are incorporated by this reference herein in their entirety.

TECHNICAL FIELD

This disclosure relates to audio rendering of audio sources (e.g., line-like audio sources).

BACKGROUND

An extended reality (XR) scene (e.g., a virtual reality (VR) scene, an augmented reality (AR) scene, or a mixed reality (MR) scene) may contain many different types of audio sources (a.k.a., "audio objects") that are distributed throughout the XR scene space. Many of these audio sources have specific, clearly defined locations in the XR space and can be considered as point-like sources. Hence, these audio sources are typically rendered to a user as point-like audio sources.

However, an XR scene often also contains audio sources (a.k.a., audio elements) that are non-point-like, meaning that they have a certain extent in one or more dimensions. Such non-point audio sources are referred to herein as "volumetric" audio sources. In many cases, such volumetric audio sources may be significantly longer in one dimension than in others (e.g., a river). This type of volumetric audio source may be referred to as a "line-like" audio source.

In some cases, such a line-like audio source may radiate sound as a single, coherent line-like sound source, e.g. a transportation pipe in a factory. In other cases, the line-like audio may instead represent a line-like area in the XR scene that contains a (more or less) continuum of independent sound sources, which together can be considered as a compound line-like audio source. One example of this is a busy highway where, although each car is in principle an independent audio source, all cars together can be considered to form a line-like audio source in the XR scene.

A typical audio source renderer (or "audio renderer" or "renderer" for short) is designed to render point like audio sources—i.e., audio sources that have a single defined position in space, and for which the signal level at a given listening position is inversely proportional to the distance to the audio source. On a decibel scale this means that the rendered signal level (corresponding to the sound pressure level (SPL) in the physical world) decreases by 6 dB for each doubling of the distance from the source.

The problem with this is that this rendering behavior as function of listening distance may not suitable for volumetric audio sources. In the real physical world, the sound pressure level of such volumetric audio sources has a different behavior as a function of listening distance. An example is a (theoretical) infinitely long line-like audio source, for which it is known that the acoustical pressure is inversely proportional to the square root of the distance, rather than to the distance itself. On the dB scale this means that the SPL decreases by 3 dB per doubling of distance, instead of the 6 dB per distance doubling of a point source (i.e., a non-volumetric audio source) (see e.g. reference [1]).

In addition, a volumetric audio source has in general a non-flat frequency response, contrary to a non-volumetric audio source. For a theoretical coherent infinitely long one-dimensional audio source it is well known that the pressure response is inversely proportional to the square root of the frequency, which is equivalent to a −3 dB/octave SPL response. For finite-size and/or partially coherent volumetric sources the behavior as function of frequency is more complex, but it will in general not be flat and may also depend on observation distance.

This means that if a volumetric audio source, i.e., a source with a non-zero physical extent in one or more dimensions, is rendered by a typical point source audio renderer, then the variation of the level and frequency response of the volumetric audio source when the virtual listener (e.g., avatar) moves around in the XR scene is not natural.

SUMMARY

Some solutions exist to render sources that have a non-zero extent with a typical point source renderer, see e.g. reference [2]. These solutions, however, only address the perceived spatial size of such sources, and do not address the incorrect variation of their level and frequency response with listening distance that is a result of the point source rendering process. In principle, one could solve the problem by representing and rendering a volumetric audio source as a dense collection of many point sources. This, however, is in general a very inefficient solution. Firstly, it has a very high computational complexity since it means that many individual audio sources must be rendered at the same time. In addition, the renderer architecture may be designed to support rendering of a limited number of simultaneous audio sources only, and this solution may use a large part (or even all) of these available sources for the rendering of just a single volumetric audio source.

Accordingly, this disclosure describes techniques for providing a more natural, physically accurate rendering of the acoustic behavior of volumetric audio sources (e.g., line-like audio sources). In one embodiment, this is achieved by applying a parametric distance-dependent gain function in the rendering process, where the shape of the parametric gain function depends on characteristics of the volumetric audio source.

In the more specific use case of a typical point source renderer, this more accurate distance-dependent rendering of volumetric audio sources may conveniently be implemented as a simple (possibly frequency-dependent) parametric gain correction to the normal audio source rendering process (which typically assumes that the audio sources are point sources).

Thus, in one aspect there is provided a method for rendering an audio source. In one embodiment, the method includes obtaining a distance value representing a distance between a listener and the audio source. The method also includes, based on the distance value (e.g., based at least in part on the distance value and one or more threshold values), selecting from among a set of two or more gain functions a particular one of the two or more gain functions. The method also includes evaluating the selected gain function using the obtained distance value to obtain a gain value to which the obtained distance value is mapped by the selected gain function. And the method also includes providing the obtained gain value to an audio source renderer configured to render the audio source using the obtained gain value and/or rendering the audio source using the obtained gain value.

In another embodiment the method includes obtaining scene configuration information, the scene configuration information comprising metadata for the audio source, wherein the metadata for the audio source comprises: i) geometry information specifying a geometry of the audio source (e.g., specifying a length of the audio source) and ii) an indicator (e.g., a flag) indicating whether or not the audio source renderer should apply an additional gain based on the obtained gain value when rendering the audio source. And the method further includes rendering the audio source based on the metadata for the audio source.

In another aspect a computer program is provided. The computer program comprises instructions which when executed by processing circuitry causes the processing circuitry to perform the method of any one of the embodiments disclosed herein. In another aspect there is provided a carrier containing the computer program, wherein the carrier is one of an electronic signal, an optical signal, a radio signal, and a computer readable storage medium.

In another aspect an apparatus is provided which apparatus is adapted to perform the method of any one of the embodiments disclosed herein. In one embodiment the apparatus comprises processing circuitry; and a memory, the memory containing instructions executable by the processing circuitry, whereby the apparatus is adapted to perform the method of any one of the embodiments disclosed herein.

Advantages

Compared to the rendering results with current audio renderers, the general advantage of the embodiments disclosed herein is a physically and perceptually more accurate rendering of volumetric audio sources, which, for example, enhances the naturalness and overall subjective rendering quality of XR scenes. Specifically, the embodiments improve the distance-dependent acoustic behavior of such audio sources compared to the common rendering process used in typical point source audio renderers.

Additional advantages of some of the described embodiments are that: i) the improved rendering can be achieved with very low additional complexity, ii) the embodiments can be implemented in a common point source renderer with minimal modification as a simple add-on to the existing rendering process, and iii) the embodiments allow various implementation models to suit different use cases.

DETAILED DESCRIPTION

The embodiments described herein can be applied to a broad range of audio sources that are volumetric in nature, such as, but not limited to, one-dimensional audio sources (a.k.a., audio line sources, acoustic line sources, or simply "line sources"). In general, the embodiments are applicable to, among other audio sources, any volumetric audio source that is relatively large in at least one dimension, for example relative to the size in one or more other dimensions, and/or relative to the distance of a virtual listener (or "listener" for short) to the source.

A finite-length audio line source can be physically modeled as a dense linear distribution of point sources. In this model, the total pressure response $P_{line}$ of a finite-length line source is given by (see e.g. [ref.1]):

$$P_{line}(\omega, \vec{r}) = \sum_{i=1}^{N} A_i(\omega)\frac{e^{-ikr_i}}{r_i},$$

with N the total number of point sources used to model the line source, $A_i(\omega)$ the complex amplitude of the $i^{th}$ point source at radial frequency ω, k the wavenumber ω/c, with c the speed of sound, and $r_i$ the distance from the $i^{th}$ point source to the observation point $\vec{r}$. The Sound Pressure Level (SPL) of the line source then follows from:

$$SPL_{line}(\omega, \vec{r}) = 20\ \log_{10}(|P_{line}(\omega, \vec{r})|).$$

When modeling a line source in this way, care must be taken to use a sufficiently small spacing between the individual point sources in order to obtain accurate results over the whole frequency range of interest (0-20 kHz).

To study the behavior of finite-length acoustic line sources, the sound pressure level and frequency response of line sources of various lengths were simulated in MATLAB using the model described above. Separate simulations were done for coherent line sources (where all points of the line source coherently radiate the same acoustical signal), and diffuse line sources (where all points of the line source radiate independent, fully uncorrelated signals). From these simulations it was found that these two extreme types of line sources behave significantly differently in various aspects.

Figure 1:
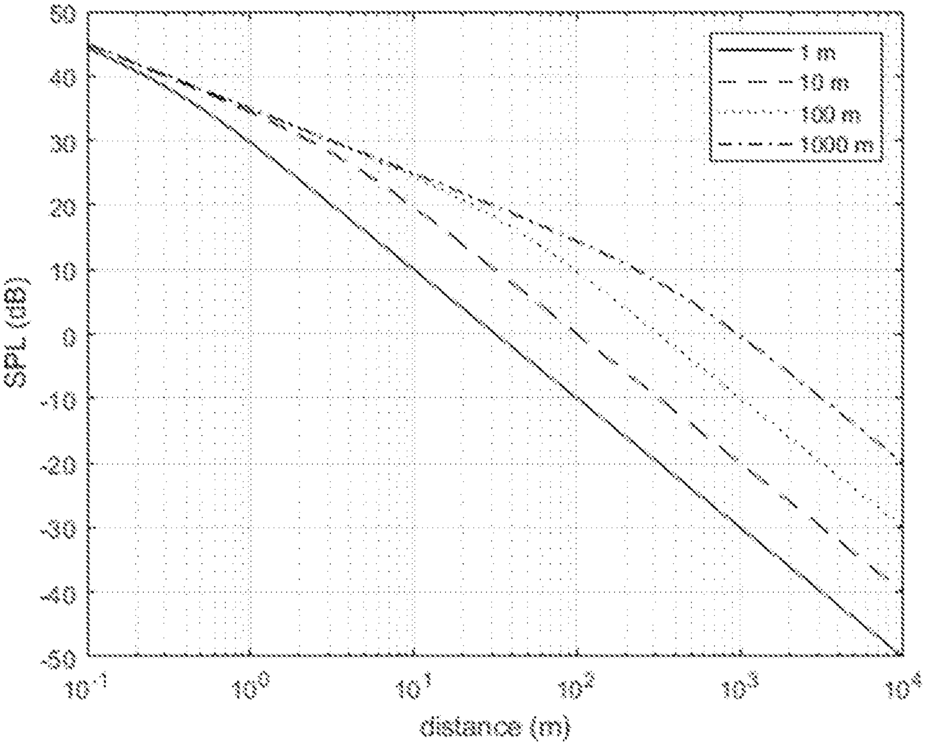
FIG. 1 shows simulation results for one example line source.

Extensive analysis of the simulation results enabled the extraction of various qualitative and quantitative properties and relationships for the different types of line sources. Analysis was carried out both as a function of the length of the line source and as a function of the observation distance from the midpoint of the line source. FIG. 1 shows simulation results for one example line source. FIG. 1 will be used below to describe the extracted general line source properties.

Figure 2:
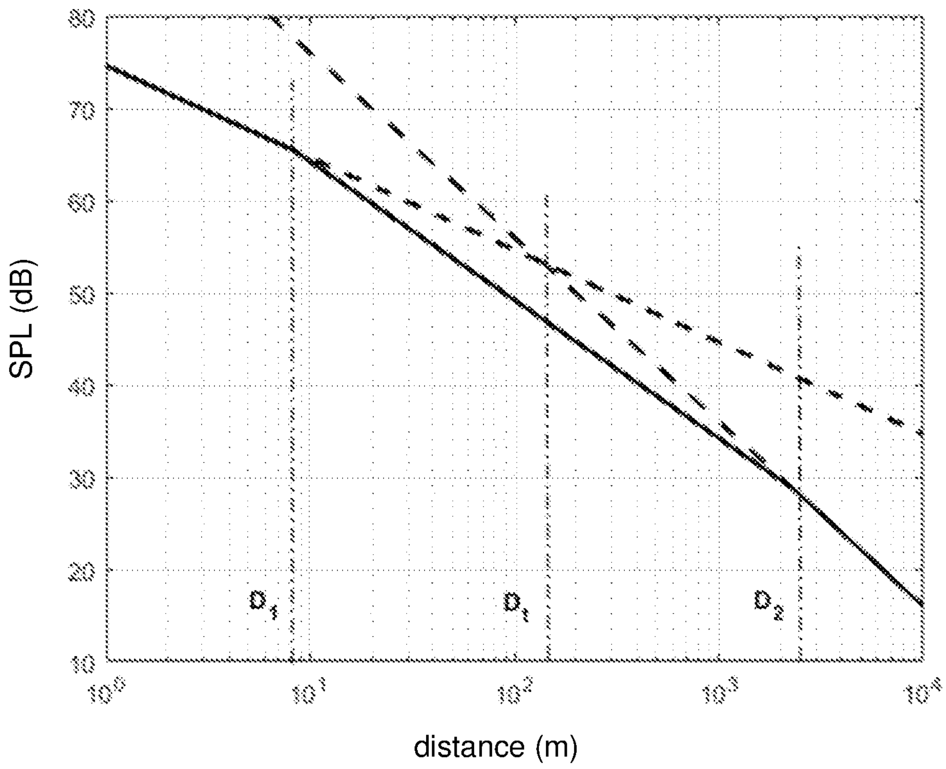
FIG. 2 illustrates various SPL-versus-distance curves.

It was found that on a logarithmic distance scale all line sources, regardless of their length or coherence type, have SPL-versus-distance curves that share a common general shape, as depicted in FIG. 2, namely: 1) a linear slope of −3 dB per distance doubling at small observation distances. In this region the source effectively behaves like a theoretical infinitely long line source; 2) a linear slope of −6 dB per distance doubling at large observation distances. In this region, the source effectively behaves like a theoretical point source; and 3) an intermediate slope at intermediate observation distances, with the slope gradually increasing from −3 dB to −6 dB with growing distance.

The transition points $D_1$ and $D_2$ that, respectively, define the end of the −3 dB-slope region and the start of the −6 dB-slope region, were found to essentially depend on: 1) the length of the line source, 2) the coherence of the line source, and 3) frequency, except for fully diffuse line sources.

Table 1 below provides an overview of the main findings from the simulations, including quantitative relationships between the various properties of the line source.

TABLE 1

| Property | Diffuse line source | Coherent line source |
|---|---|---|
| Point source region (SPL decreases by −6 dB per doubling of distance) | D > L | Frequency-dependent: =D > $L^2f/a^2$<br>Broadband (approximately): D > 23 $L^2$ |
| Line source region (SPL decreases by −3 dB per doubling of distance) | D < L/6 | Frequency-dependent: D < $L^2f/a^2$<br>Broadband (approximately): D < .082 $L^2$ |
| SPL as function of source length | | |
| in point source region | +3 dB per doubling of length | +6 dB per doubling of length |
| in line source region | constant | constant |
| Frequency response | | |
| in point source region | Flat | flat |
| in line source region | Flat | −3 dB/octave (∝1/f) |

1. Common Line Source SPL Parameterization Model

From the extracted properties and relationships in Table 1 it was found to be possible to parameterize the SPL and frequency behavior of the different types of line sources as a function of listening distance in a single, simple yet accurate parametric model.

Specifically, it was found that the SPL as function of listening distance may be modeled by a 3-piece linear curve on a logarithmic distance scale, as follows (and shown in FIG. 2, solid curve, for a specific value of $c_0$ and a):

$$SPL = \begin{cases} c_0 - 10\log_{10}(D); & D < D_1 \\ c_0 + (\alpha - 10)\log_{10}(D_1) - \alpha\log_{10}(D); & D_1 \le D \le D_2 \\ c_0 + (\alpha - 10)\log_{10}(D_1) + (20 - \alpha)\log_{10}(D_2) - 20\log_{10}(D); & D > D_2 \end{cases} \quad \text{(Eq. 1)}$$

with the values for $D_1$ and $D_2$ being a function of the length (L) of the line source, and possibly also of frequency. $D_1$ and $D_2$ are also indicated in FIG. 2 for the specific values of $c_0$ and a.

The parameter α determines the slope within the transition region and depends on the type of line source, with −20≤α≤−10 dB per distance decade. In many cases it is appropriate to set the transition region slope parameter α to −15 dB per distance decade (corresponding to −4.5 dB per distance doubling), i.e. the average of the slopes in the line and point source regions. In that case, equation 1 becomes:

$$SPL = \begin{cases} c_0 - 10\log_{10}(D); & D < D_1 \\ c_0 + 5\log_{10}(D_1) - 15\log_{10}(D); & D_1 \le D \le D_2 \\ c_0 + 5\log_{10}(D_1 D_2) - 20\log_{10}(D); & D > D_2 \end{cases} \quad \text{(Eq. 2)}$$

The parameter $c_0$ is a free constant that can be chosen such that e.g. a desired SPL is obtained at some reference distance from the line source, or that satisfies some other desired boundary condition. For several reasons, often a convenient choice is $c_0 = -5\log_{10}(D_1 D_2)$, which leads to:

$$SPL = \begin{cases} -5\log_{10}(D_1 D_2) - 10\log_{10}(D); & D < D_1 \\ -5\log_{10}(D_2) - 15\log_{10}(D); & D_1 \le D \le D_2 \\ -20\log_{10}(D); & D > D_2 \end{cases} \quad \text{(Eq. 3)}$$

Essentially, this choice for free parameter $c_0$ results in the SPL being a function of only observation distance in the region where the line source behaves like a point source, i.e. at distances beyond $D_2$. So, this choice for $c_0$ results in a normalization that makes the response in the far field independent of the length L of the line source (which in many use cases is a desirable property).

Although the 3-piece linear parameterization described above is a very simple approximation of the exact SPL-vs-distance curves of finite-length line sources, it was found that the error that is made using this approximation is usually negligible, typically less than 1 dB over the whole distance range of interest. This suggests that a more accurate parameterization is in general not necessary or useful.

In fact, it was found that in many cases an even simpler 2-piece linear parameterization with only the −3 dB and −6 dB slope regions (i.e. without an intermediate-slope transition region) also provides sufficiently accurate results. This parameterization can be described as (FIG. 2, dashed curves):

$$SPL = \begin{cases} c_0 - 10\log_{10}(D); & D \le D_t \\ c_0 + 10\log_{10}(D_t) - 20\log_{10}(D); & D > D_t \end{cases} \quad \text{(Eq. 4)}$$

or, with the specific choice for $c_0$ as above:

$$SPL = \begin{cases} -10\log_{10}(D_t) - 10\log_{10}(D); & D \le D_t \\ -20\log_{10}(D); & D > D_t \end{cases} \quad \text{(Eq. 5)}$$

where $D_t$ is the intersection point of the −3 dB and −6 dB asymptotes (also indicated in FIG. 2 for the specific values of $c_0$ and $\alpha$), which on a logarithmic distance scale is located halfway between $D_1$ and $D_2$ and is given by:

$$D_t = \sqrt{D_1 D_2}.$$

As mentioned, a more accurate parameterization than the 3-piece linear, or even 2-piece linear curve is in generally not necessary. Still, if a smoother transition between the different regions is desired then this can be achieved by using a quadratic approximation within the transition region:

$$SPL = \begin{cases} c_0 - 10\log_{10}(D); & D < D_1 \\ c_0 + a_1 x^2 + a_2 x + a_3; & D_1 \le D \le D_2 \\ c_0 + 5\log_{10}(D_1 D_2) - 20\log_{10}(D); & D > D_2 \end{cases}$$

with $x=\log_{10}(D/D_1)$. The parameters $a_1$, $a_2$, and $a_3$ are chosen such that both the SPL and its slope are continuous at $D_1$ and $D_2$. It can be shown that this is the case for:

$$a_1 = \frac{-5}{\log_{10}(D_2/D_1)},\ a_2 = -10,\ a_3 = -10\log_{10}(D_1).$$

FIG. 2 shows an example of the 3-piece linear, 2-piece linear and quadratic parameterizations, as well as the corresponding transition points $D_1$, $D_2$ and $D_t$

2. Specific Forms of the Common Parameterization Model for Specific Types of Line Sources From the general SPL parameterizations of equations 1-5 one can derive parametric descriptions for the behavior of various more specific types of line sources. Specific examples include: 1) diffuse finite-length line source, 2) coherent finite-length line source, and 3) partially-coherent finite-length line source.

2.1 Diffuse Finite-Length Line Source

In the case of the diffuse line source, the parametric model takes the form of a distance-dependent, frequency-independent gain function according to equation 2 above (i.e. with transition region slope parameter $\alpha$=−15 dB per distance decade, equivalent to −4.5 dB per distance doubling).

Transition distances $D_1$ and $D_2$ for the diffuse line source are proportional to the line source length L. Simulations suggest $D_1$=L/6 and $D_2$=L as appropriate values (see also Table 1).

For the simplified 2-piece approximation according to equation 4 it follows that the corresponding transition point is at $D_t=\sqrt{D_1 D_2}=L/\sqrt{6}$.

2.2. Coherent Finite-Length Line Source

In the case of parameterization of the behavior of a (partially) coherent line source, a choice can be made between including a modeling of its frequency-dependent behavior, which is more realistic but also a little bit more complex, or only modeling its approximate broadband behavior.

In the more accurate frequency-dependent case, the simulations showed that there is a frequency-dependent transition between line source and point source behavior at a transition point $D_t=fL^2/a^2$ (see Table 1), without a clear transition region. Simulation results suggested a value of 18.4 for the constant a. In the line source region, the SPL curve has a −3 dB/octave frequency dependency, while the frequency response is flat in the point source region, in line with the known theoretical properties of acoustical line- and point sources, respectively.

Given the observations described above, a suitable parameterization for a given single frequency f is therefore the 2-piece linear parameterization according to equation 4, but now with the transition distance $D_t=L^2f/a^2$ being dependent on frequency. This implies that equation 4 now defines a set of frequency dependent gain functions, one for each observation distance D.

A requirement for these gain functions is that their response is flat above the transition distance $D_t$ where the source behaves like a frequency-independent point source. In other words, at large observation distances the SPL-vs-distance curves for different frequencies should converge. This desired behavior is achieved by the specific choice for $c_0$ that lead to equation 5. Then, given a source of length L and an observation distance D we can rewrite equation 5 as a function of frequency f:

$$SPL(f) = \begin{cases} -20\log_{10}(D); & f < a^2 D/L^2 \\ -10\log_{10}(f) - 20\log_{10}(L/a) - 10\log_{10}(D); & f \ge a^2 D/L^2 \end{cases} \quad \text{(Eq. 6)}$$

Figure 3:
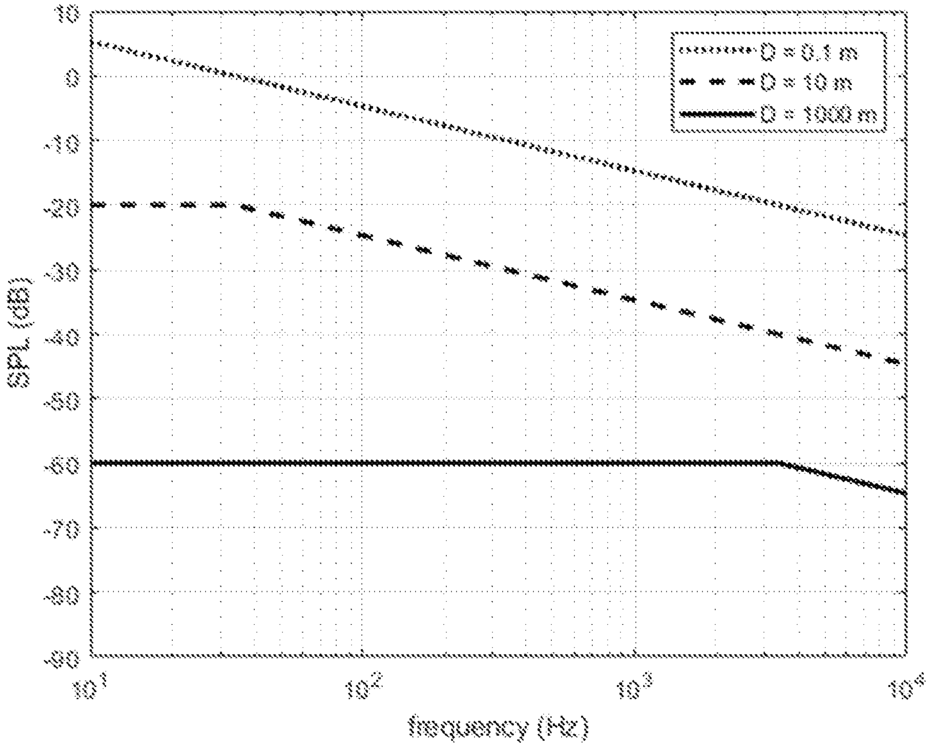
FIG. 3 shows resulting distance-dependent gain functions for a coherent line source of length L=10 m, for three observation distances.

FIG. 3 shows the resulting distance-dependent gain functions for a coherent line source of length L=10 m, for three observation distances D. They indeed exhibit the desired behavior, namely: a flat response at very large observation distances (consistent with point source behavior), a −3 dB/octave response at very small observation distances (consistent with line source behavior), and a combination of the two at intermediate observation distances. Furthermore, we see a −6 dB SPL decrease per distance doubling in the flat-response region, and a −3 dB SPL decrease per distance doubling in the −3 dB/octave region, again consistent with, respectively, point source and line source behavior.

In the case of only modeling the approximate broadband behavior of a coherent line source, the parametric model is generally the same as for the diffuse line source but now with the values of $D_1$ and $D_2$ being proportional to $L^2$ instead of L. Simulation results suggest $D_1\approx0.082L^2$ and $D_2\approx23L^2$ as appropriate approximate values. It follows that for the 2-piece approximation the transition point $D_t$ is now at: $D_t=\sqrt{D_1 D_2}\approx1.37L^2$. Also, simulations showed a somewhat shallower slope of the SPL-vs-distance curve in the transition region in this case, averaging to about −12 dB per distance decade (equivalent to −3.6 dB per distance doubling) instead of the −15 dB per distance decade (equivalent to −4.5 dB per distance doubling) in the case of the diffuse line source. This suggests it is appropriate to use a value of $\alpha$=−12 dB per distance decade in equation 1 in this case.

2.3 Partially-Coherent Finite-Length Line Source

Many real-life line-like sound sources will be neither fully diffuse, nor fully coherent. Typically, the degree of coherence of a physical sound source's acoustic radiation will depend on frequency, being more coherent at lower frequencies and more diffuse at higher frequencies.

One simple way to model this behavior is by combining the diffuse and coherent parametric SPL models derived above, for example as a linear combination of the coherent SPL, $SPL_c$, and the diffuse SPL, $SPL_d$, with a frequency-dependent coherence parameter $\beta(f)$:

$$SPL_{mix} = \beta(f)SPL_c + (1-\beta(f))SPL_d,$$

or, more preferably, as a linear combination of coherent and diffuse linear gains:

$$SPL_{mix} = 20\log_{10}\{\beta(f)10^{SPL_c/20} + (1-\beta(f))10^{SPL_d/20}\}.$$

In these equations the coherent $SPL_c$ term may, for example, be parameterized according to equation 4 with the transition frequency $D_t$ being frequency-dependent as described before. The diffuse $SPL_d$ term may be parameterized according to equation 4 as well, with the difference that in this case $D_t$ is independent of frequency. Alternatively, the $SPL_d$ term may be parameterized according to the 3-piece parameterization, equation 2.

In one simplified embodiment the coherence parameter $\beta(f)$ is equal to 1 below some transition frequency $f_t$ and equal to 0 above it. In that case, the line source has two distinct frequency regions: a first frequency region below $f_t$ where the source is fully coherent, and a second frequency region above $f_t$ where it is fully diffuse.

The model for a partially-coherent line source suggested above assumes that the source has a frequency-dependent coherence that is the same along its entire length. An alternative, and for many real-life sources physically more accurate model may include a frequency-dependent spatial coherence function that models the degree of coherence between different points along the line source, with the degree of coherence typically decreasing with increasing distance between two points. Typically, this spatial coherence function would be broader for low frequencies than for high frequencies, i.e. at high frequencies the coherence between two points along the line source decreases more rapidly with increasing distance between them than at low frequencies.

3. Point-Source Normalization of the Model

Today's audio source renderers are typically designed to efficiently render point sources, so it is convenient to relate the properties of a line source to that of a point source. As will be shown below, this makes it possible to achieve the correct distance-dependent behavior for a line source by means of a simple modification to the rendering process of a conventional point source.

A point source renderer implicitly assumes that each audio source is a point source and, accordingly, applies a distance-dependent gain attenuation corresponding to point source behavior as an inherent part of its rendering process. Specifically, it applies a gain attenuation to the source's direct sound that is proportional to the listener's distance to the source (equivalent to an SPL decrease of 6 dB per distance doubling).

Figure 4:
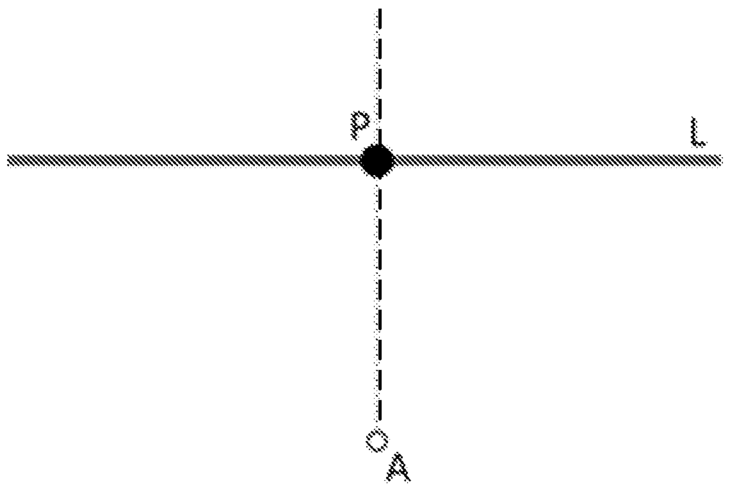
FIG. 4 illustrates a one-dimensional audio source having a length L and a midpoint P.

Therefore, in many practical use cases it is convenient to normalize the parametric SPL-vs-distance function for a line source, as given by any one of equations 1-6 above, with the free-field SPL-vs-distance function of a unit-gain point source positioned at the midpoint of the line source (see FIG. 4).

The free-field SPL-vs-distance function of the unit-gain point source is given by:

$$SPL_{point} = -20\log_{10}(D),$$

and the point-source normalized version of the 3-piece linear parametric SPL model of equation 2 is therefore given by:

$$SPL_{norm} = \begin{cases} c_0 + 10\log_{10}(D); & D < D_1 \\ c_0 + 5\log_{10}(D_1) + 5\log_{10}(D); & D_1 \le D \le D_2 \\ c_0 + 5\log_{10}(D_1 D_2); & D > D_2 \end{cases}. \quad \text{(Eq. 7)}$$

With the specific choice for $c_0$ as before this leads to:

$$SPL_{norm} = \begin{cases} -5\log_{10}(D_1 D_2) + 10\log_{10}(D); & D < D_1 \\ -5\log_{10}(D_2) + 5\log_{10}(D); & D_1 \le D \le D_2 \\ 0; & D > D_2 \end{cases}. \quad \text{(Eq. 8)}$$

From this equation it can be seen that the normalized parameterized SPL increases by +3 dB per distance doubling at distances below $D_1$, by +1.5 dB per distance doubling between $D_1$ and $D_2$, and that it is constant for distances beyond $D_2$ (with the specific choice for $c_0$ it is 0, in other words: the normalized SPL of the line source is equal to that of the unit-gain point source).

Figure 5:
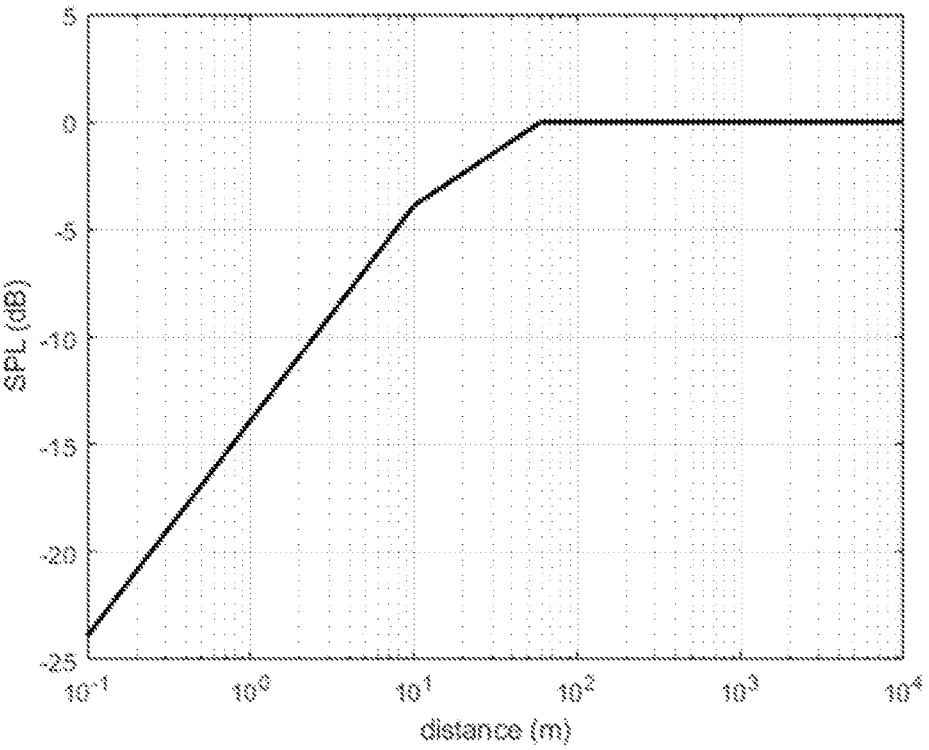
FIG. 5 shows a normalized parameterized SPL for an example diffuse line source.

FIG. 5 shows the normalized parameterized SPL for a diffuse line source of 60 m length, i.e. $D_1$=10 m and $D_2$=60 m.

Note that the point-source normalization with the specific choice for $c_0$ as in equation 8 results in a line source rendering method in which the gain is only modified, compared to the standard rendering of a point source, when the listening distance to the line source is smaller than $D_2$. In other words, for listening distances beyond $D_2$ the rendering of the line source is identical to that of a unit-gain point source, which is a very convenient property for many use cases.

The normalized versions of equations 4 and 5 are given by:

$$SPL = \begin{cases} c_0 + 10\log_{10}(D); & D \le D_t \\ c_0 + 10\log_{10}(D_t); & D > D_t \end{cases}, \quad \text{(Eq. 9)}$$

and, with the specific choice of $c_0$:

$$SPL = \begin{cases} -10\log_{10}(D_t) + 10\log_{10}(D); & D \le D_t \\ 0; & D > D_t \end{cases}. \quad \text{(Eq. 10)}$$

In the case of a coherent line source, the point-source normalized version of the distance-dependent gain functions of equation 6 is given by:

$$SPL(f) = \begin{cases} 0; & f < a^2D/L^2 \\ -10\log_{10}(f) - 20\log_{10}(L/a) + 10\log_{10}(D); & f \geq a^2D/L^2 \end{cases}. \quad \text{(Eq. 11)}$$

Figure 6:
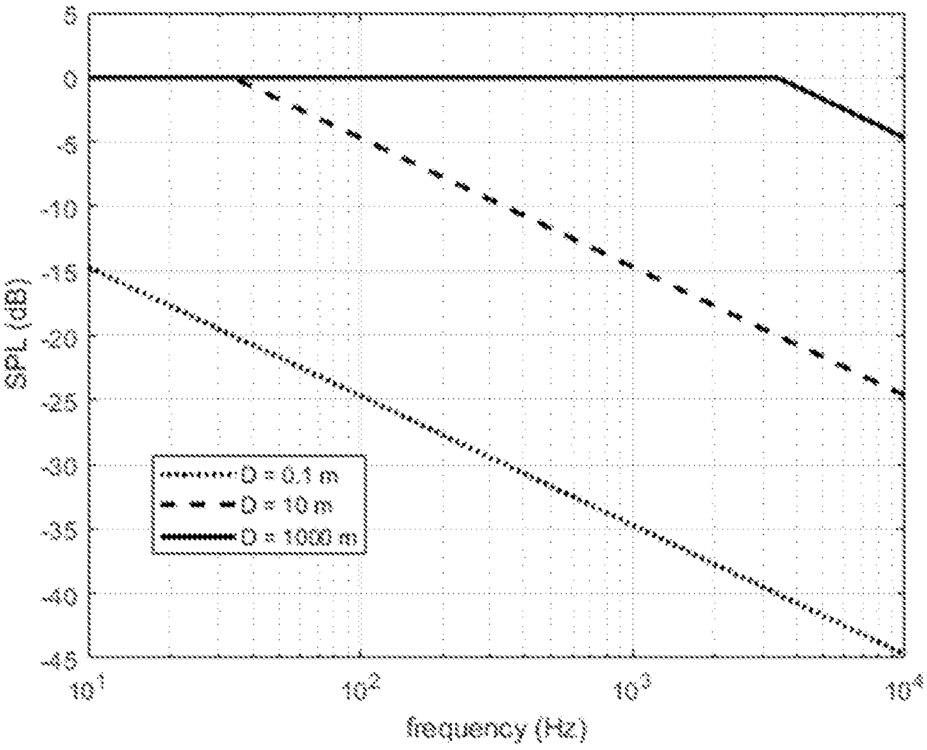
FIG. 6 shows normalized filters for several observation distances.

FIG. 6 shows the normalized filters for several observation distances.

4. Off-Axis Listening Positions

In the description above it was assumed that the observation position is located on-axis relative to the midpoint of the line source. In practice this is of course not always the case, but this is not a problem. The same general parametric SPL model, with a line source region, a transition region and a point source region, can be applied to off-axis listening positions as well, and the values in Table 1 can still be used as a guideline in determining the source's SPL behavior as function of listening position.

One simple way to deal with off-axis positions is to use the distance to the midpoint of the line source as observation distance D, and then apply the exact same model as for on-axis positions without any modification. In other words, for a diffuse line source, if the distance to the line source's midpoint is larger than the source's length L, then the source's SPL behavior is that of a point source while if it is smaller than L/6 it behaves like a line source.

Alternatively, a modified (reduced) source length may be used for off-axis positions in the parametric SPL model, reflecting the fact that the effective source length as seen from off-axis listening positions is smaller than the actual (physical) source length L. For example, a projected source length may be used instead of the physical source length. The general SPL behavior of the line source will still be the same in this case also; the only effect that the modified source length has, is that the transition points between the different regions in the parametric SPL curve will occur at smaller distances than for on-axis listening positions.

5. Direct Implementation of the Parametric SPL-Vs-Distance Model in a Renderer In one embodiment, the desired SPL-vs-distance behavior of a line source can be achieved by directly implementing the appropriate parameterized SPL curve, e.g. according to any one of equations 1-6 above, in the audio renderer.

That is, for a given listener position relative to the line source, the appropriate relative sound level at that listening position is determined from the parametric model and the line source's signal is rendered to the listener with a gain that results in that sound level. This implementation might be considered a dedicated line source renderer.

For a coherent line source, the desired frequency-dependent rendering behavior as function of distance was described by equation 6 and shown in FIG. 3. If the renderer operates in the frequency domain, then this desired distance-dependent frequency response can be realized by simply applying appropriate gain factors to the individual frequency bands. If the renderer operates in the time domain, then given the simple shape of the required filters (which are essentially low-pass shelving filters with a distance-dependent cut-off frequency), they can be implemented very efficiently as e.g. low-order infinite impulse response (IIR) filters.

This also applies to the rendering of partially coherent line sources, since their desired distance-dependent behavior can be achieved by modeling them as a linear combination of a diffuse and a coherent line source, as was described above.

The same renderer may of course also have additional rendering modes for other types of sources, e.g. point sources.

Alternatively, the renderer may be a generic renderer that can be configured to apply any desired gain function in accordance to the type of source to be rendered.

6. Implementation of the Parametric SPL-Vs-Distance Model as a Gain Modification in a Common Point-Source Object Renderer In the previous embodiment the desired SPL-vs-distance behavior of a line-like audio source was achieved by directly implementing the parameterized SPL curve in the renderer, resulting in a dedicated line source renderer (or renderer mode).

Today's audio source renderers, however, are typically designed and configured to render point source objects. So, in an embodiment that is suitable for implementation in a typical point source renderer the desired distance-dependent line source behavior is implemented by means of an additional distance-dependent gain unit according to one of the normalized equations 7-11 above.

Basically, the point source renderer renders the line source object in the same way as it would render a "normal" point source object, with the only difference being the additional gain that is applied to the line source object's signal.

For example, if the line source is represented by a single mono audio signal plus metadata, it may be rendered as a regular mono audio source, including the usual application of the source's position- and other metadata (e.g. "spread" or "divergence" metadata), with only the additional step of applying the additional gain as described above (a.k.a., the "line source gain correction").

In another example the line source object may be represented by a stereo (or more generally multi-channel) signal. Typically, a point source renderer may render a stereo audio element/channel group as a pair of virtual stereo loudspeakers (which are essentially two individual point sources) that render the left and right stereo signal, respectively. Now, in the case of the stereo line source object the renderer will do exactly the same, with again as only difference that the signals for the virtual loudspeakers are modified by the line source gain correction as described above. An example is a VR scene of a beach containing a line-like audio element for the sound of breaking waves on the shore line, which might be represented in the bitstream by a stereo signal (e.g. as recorded at an actual beach).

The normalized gain function for the line source object can be implemented in various ways. One way is to apply the gain function as a modification of the existing gain parameter that is part of the metadata that accompanies each audio source's audio signal in the bitstream, and which essentially conveys the object's source strength. The advantage of this implementation is that essentially no changes need to be made to the actual rendering engine. It is just a matter of setting the object's gain appropriately.

Another option is to introduce an additional gain block in the renderer process that has the dedicated purpose to apply the required normalized gain modification for a line source object. The advantage of this implementation is that it keeps a clearer separation of functionalities in the rendering process, since it does not mix together the object's regular source gain with the additional line source correction gain, which are essentially two independent properties of the source.

It will be understood, however, that the two options for implementing the line source gain function described above are effectively the same, and that any combination or distribution of the various gain components for a line source along the rendering chain may be used.

7. Distribution of Parameterization Process, and Metadata to be Transmitted

Different implementation models can be used regarding where the parametrization of the line source SPL curve is carried out, and, consequently, which data is transmitted to the renderer.

Figure 7A:
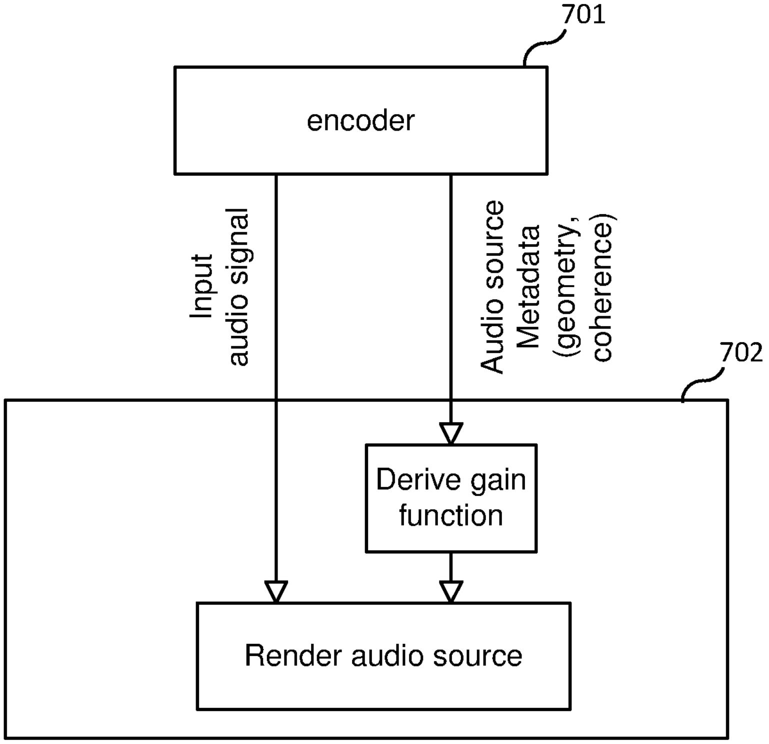
FIG. 7A illustrates an embodiment in which SPL-vs-distance parametrization for a source is carried out by an audio source renderer.

In one embodiment, the parameterization is implemented entirely in an audio source renderer 702 (or "renderer 702" for short) (see FIG. 7A). This would enable the renderer 702 itself to determine the required gain curves for a source based on some received elementary information about its properties. This source information is sent by an encoder 701 to the renderer 702 as object metadata and should include at least the source's length (or, in general, its geometry).

The object metadata may also include an indicator/flag to instruct the renderer 702 whether it should apply an additional gain (which may be referred to as a "distance-dependent line source gain") to this source, giving the content creator or encoder system the possibility to disable the application of a distance-dependent line source gain in the renderer 702, if desired.

Additional metadata that could be useful includes one or more indicators/flags, e.g. to instruct the renderer 702 whether it should derive the distance-dependent gain function from the received source geometry metadata (using its internal line source SPL parameterization model), or that it should instead treat the source as one of several line source prototypes, e.g. an infinitely long line source or a point source, i.e. disregarding the source's actual geometry metadata.

Additionally, the metadata sent to the renderer 702 may include information describing the source's coherence behavior, e.g. that it is a "diffuse", "coherent" or "partially coherent" line source. In the latter case further information might be included, e.g. a transition frequency between coherent and diffuse behavior, or a frequency-dependent coherence parameter, as described earlier.

Based on the various received information and instructions as described above, the renderer 702 would in this scenario know whether and how to adapt the rendering of a source, and in response could for example switch to an appropriate rendering mode or apply a suitable gain curve in rendering the source in question.

Figure 7B:
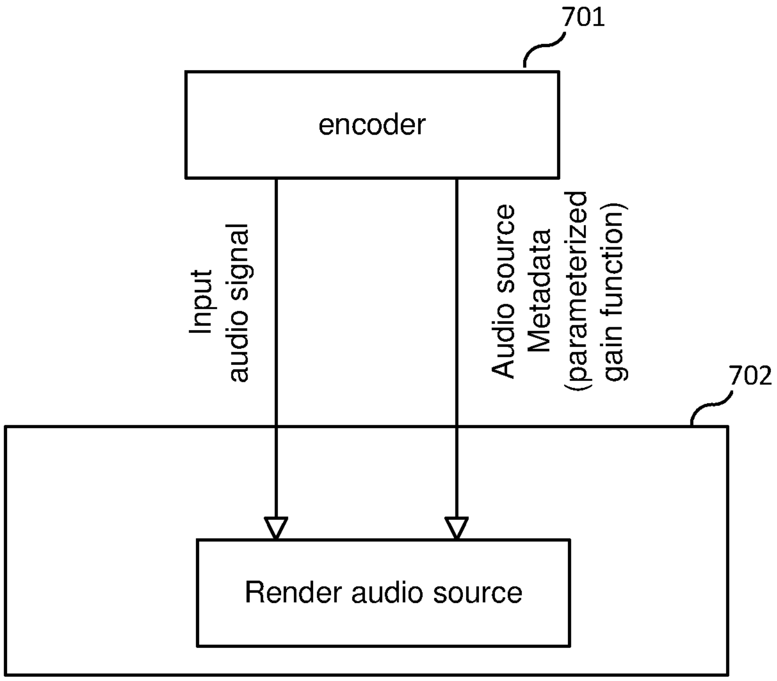
FIG. 7B illustrates an embodiment in which SPL-vs-distance parametrization for a source is carried out by an encoder.

In another embodiment (see FIG. 7B) the SPL-vs-distance parametrization for a source is carried out at the encoder 701, and the resulting gain functions (either in point-source normalized or non-normalized form) are sent to the renderer 702 as a table that maps a set of distance (D) values to a set of gain values according to the functions. The advantage of this model would be that it only requires a minor modification of renderer 702's existing renderer engine, i.e. it only needs to be able to receive and process the additional gain metadata instead of deriving it from source geometry metadata itself.

In yet another embodiment, the encoder carries out the SPL-vs-distance parameterization for the source, but instead of sending a table with gain values it sends the derived values of the parameters for the parametric model, including at least $D_1$ and $D_2$. In addition it may send additional model parameters, e.g. the values of $c_0$ and/or $\alpha$. The renderer then receives the parameters and uses these to derive corresponding distance-dependent gains from the parametric model, as described earlier. So, this embodiment assumes that the renderer includes functionality that is able to derive appropriate gain values from the received parameter values.

Also in the latter two embodiments the object metadata may include a flag to instruct the renderer 702 whether to actually apply the received distance-dependent gain function to the source in question.

Note that as long as the source geometry doesn't change, the result of the parametric model doesn't change either, so that the parametric gain function information only needs to be transmitted to the renderer once, at initialization (or after a change in the source's geometry).

8. Additional Remarks

Note that in some use cases, depending on both the length of the line source and the XR scene in which the listener is able to move around (as e.g. set by the content creator), the listener may effectively always be located in either the "$D<D_1$" or "$D>D_2$" region. For example, if the line source is specified to be very (or even infinitely) long, then any listening position where the listener can go will be in the "$D<D_1$" region, meaning that according to the parametric model the source behaves like a line source at any listening position that the listener is able to go to.

Conversely, if the line source is relatively short and the content creator has restricted the XR scene such that the listener cannot go close to the source, then the listener may effectively always be in the "$D>D_2$" region so that the audio source behaves like a conventional point source at every reachable listening position within the XR scene.

Note that in the discussion above, all gain equations have been defined in terms of logarithmic SPL. If linear-scale gain functions are desired in an implementation instead, then these can easily be obtained from the SPL equations above using the relationship between SPL and pressure magnitude:

$$SPL \propto 10 \log_{10}(P^2),$$

noting that pressure is directly proportional to source gain for a point source.

For example, the linear-scale gain g corresponding to the logarithmic SPL in Eq. 3 is given by:

$$g = \begin{cases} (D_1 D_2)^{-0.25} \times D^{-0.5}; & D < D_1 \\ D_2^{-0.25} \times D^{-0.75}; & D_1 \le D \le D_2 \\ D^{-1}; & D > D_2 \end{cases}. \quad \text{(Eq. 12)}$$

Similarly, the linear-scale gain $g_{norm}$ corresponding to the point-source normalized logarithmic SPL in Eq.8 is given by:

$$g_{norm} = \begin{cases} (D_1 D_2)^{-0.25} \times D^{0.5}; & D < D_1 \\ D_2^{-0.25} \times D^{0.25}; & D_1 \le D \le D_2 \\ 1; & D > D_2 \end{cases}. \quad \text{(Eq. 13)}$$

So, when expressed in terms of linear-scale gain the point-source normalized model is found by simply multiplying the non-normalized model by the distance D.

There a several ways in which to determine the coherence properties of an audio source, i.e. whether it is a diffuse, coherent or partially-coherent source (and in the latter case, what are its more detailed coherence properties). For example, in a synthetically generated scene it could be possible for a content creator to set these properties explicitly, e.g. on artistic grounds, and include them as metadata in the bitstream. For example, the content creator may select one of multiple "coherence" options for an audio source in his content authoring software. In the case of real-life recorded material it may also be possible to extract a source's coherence properties from the recorded spatial (e.g. stereo) audio signals, possibly in combination with extra information regarding e.g. the microphone setup that was used for the recording.

It should be appreciated that the applicability of the described models are not limited to sources that are perfectly straight. The models can also be used for line-like audio sources that are somewhat curved or irregularly shaped, especially if they are of a more diffuse nature. If the listener is relatively far away from such a source, it can in many cases effectively be considered as a straight line, so that the models described herein can be applied to it. On the other hand, if the user is relatively close to such a source, then it will typically mainly be the part of the source closest to the listener that will dominate the sound received at his position, which in many cases may then be approximated and treated as a line-like segment.

9. Extension to Two-Dimensional (2D) Audio Sources

The description above focused on volumetric audio sources that are relatively long in one dimension ("line-like" sources). However, the concept can be extended to volumetric audio sources that are relatively large in two dimensions ("surface" sources) in a relatively straightforward way. For such sources the SPL behavior may, depending on the observation distance and the size of the volumetric audio source in the two dimensions, be that of a point source (i.e. −6 dB per distance doubling), a line source (i.e. −3 dB per distance doubling), or a theoretical infinitely large 2D planar source (constant SPL as function of distance), with transition regions. For example, for a volumetric audio source with a square surface (as seen from the listener perspective), the behavior may be that of a 2D planar source at close distances, and a point source at large distances, with a transition between these two behaviors in a transition region.

For a volumetric audio source with a surface that is larger in one dimension than in the other (but still having a significant size in the smaller dimension also), the behavior may be that of a 2D planar source at small distances, going to line source behavior at intermediate distances where the smaller dimension becomes essentially insignificant, and finally to point source behavior at large distances where both dimension become insignificant. The distance-dependent frequency response of such volumetric surface sources follows from a similar extension of the model for line sources as described in detail above.

So, as described above the SPL of a 2D source as function of decreasing observation distance will be a monotonous function with a slope that goes from −6 dB per distance doubling at large distances, to essentially 0 dB per distance doubling at extremely small distances.

This SPL curve can be parameterized in a similar way as in the 1D case, i.e. by approximating it by a number of linear segments on a double logarithmic scale (i.e. decibel versus logarithmic distance). One way to do this is to add one or more additional linear segments to the 1D model, e.g. adding two segments with slopes of e.g. 0 dB and −1.5 dB per distance doubling to the three segments of the 1D model of Eq.12, i.e.:

$$g = \begin{cases} (D_1D_2D_3D_4)^{-0.25}; & D < D_4 \\ (D_1D_2D_3)^{-0.25} \times D^{-0.25}; & D_4 \le D < D_3 \\ (D_1D_2)^{-0.25} \times D^{-0.5}; & D_3 \le D < D_1 \\ D_2^{-0.25} \times D^{-0.75}; & D_1 \le D < D_2 \\ D^{-1}; & D \ge D_2 \end{cases}, \tag{Eq. 14}$$

or, with point-source normalization (reference to Eq.13):

$$g_{norm} = \begin{cases} (D_1D_2D_3D_4)^{-0.25} \times D; & D < D_4 \\ (D_1D_2D_3)^{-0.25} \times D^{0.75}; & D_4 \le D < D_3 \\ (D_1D_2)^{-0.25} \times D^{0.5}; & D_3 \le D < D_1 \\ D_2^{-0.25} \times D^{0.25}; & D_1 \le D < D_2 \\ 1; & D \ge D_2 \end{cases}. \tag{Eq. 15}$$

While the conceptual 2D model shown above looks like a direct extension of the 1D model, it should be realized that the values of the model parameters $D_1$ and $D_2$ are not necessarily the same as in the 1D model, as the sizes in the two dimensions have a combined influence on the overall SPL behavior of the 2D source. In fact, it is not necessarily so that a clear "line source region" (with a slope of −3 dB per distance doubling) and/or a clear transition region (with a slope of −4.5 dB per distance doubling) can be identified in the SPL curve of the 2D source, as was the case for the 1D source. As a result, the SPL curve for the 2D source may in some cases be more efficiently approximated by a number of linear segments with other slopes and/or threshold distances than those used in the 1D model and those shown in Eq.14 and Eq.15 above. Some suitable implementations of the 2D model will now be described.

Essentially, the SPL curve of the 2D source and how it differs from the 1D source model depends on the ratio between the sizes in the two dimensions. Intuitively it is clear that the 2D model should converge to the 1D model for sources that are much larger in one dimension than in the other, while the largest deviation from the 1D model can be expected for a source that has equal size in both dimensions (i.e. a square or circular source).

To obtain detailed insights into the SPL behavior of diffuse 2D sources and determine the parameters for the corresponding 2D model, MATLAB simulations were carried out for diffuse 2D rectangular sources of various absolute sizes of the source's largest dimension and various ratios of the sizes in the two dimensions. These simulations provided the following insights:

If $L_1$ and $L_2$ are the sizes in the two dimensions, with $L_1>L_2$, then for $D>L_2$ the behavior of the 2D diffuse source is essentially identical to a 1D diffuse source of length $L_1$. In other words: the 1D model can be used for a 2D source at distances larger than the smallest dimension of the source.

This further implies that $D_2$ in the 2D model of Eq.14 is equal to the largest dimension $L_1$, and that:

- If $(L_2/L_1)<1/6$, then $D_1=L_1/6$ (the same as for a 1D source of length $L_1$), and the SPL curve has a slope of −3 dB per distance doubling for $L_2<D<D_1$. So, in this case $D_3=L_2$.
- If $(L_2/L_1)>1/6$, then $D_1=L_2$, and the 2D curve will deviate from the 1D curve for distances $D<L_2$.

The expected "infinite plane" behavior with constant SPL at very small distances is never actually reached for any finite-sized 2D source. As the distance becomes smaller and/or the size of the source increases, the slope of the SPL curve does flatten out more and more, but it never becomes constant in the same way as the slope of the 1D curve reaches the −3 dB and −6 dB slope asymptotes. The reason for this is that if the size in both dimensions of the 2D source is increased by equal steps (e.g., 1 cm), the source area (and thus amount of source power) that is added by each step increases linearly with the size of the source, whereas in the 1D case the amount of power that is added with each 1 cm size increase is equal (i.e. it is independent of the size of the source). This means that while the contributions from the outer edges of the 1D source become less and less significant with increasing total size rather quickly, in the 2D case this process is to some degree counteracted by the increasing power that is coming from the outer edges.

From the simulations, it appeared that in the region $D<L_2/6$ (where the source can be said to have "line source" behavior also in the smallest dimension) the SPL curve can be approximated by a linear slope of approximately −0.75 dB per distance doubling (−2.5 dB per distance decade) down to very small distances (typically in the mm region).

As before, the corresponding point-source normalized model is found by multiplying Eq.16 by D.

With $L_2=0$, the 2D model of Eq.16 simplifies to the 1D model of Eq.13, as intended. For $L_2<L_1/6$, the 2D model of Eq.16 is identical to the 1D model for $D>L_2/6$.

The model of Eq.16 was found to be a very good approximation to the simulated 2D curve, which is believed to be a good approximation of the "real" curve for a 2D source. The largest error occurs for a square source but is never larger than a few decibels (with the maximum error occurring around $D=L_2/6$), and typically occurs at very small distances only. In any case, the 2D model of Eq. 16 is much closer to the simulated 2D curve than the 1D model.

Although the model of Eq.16 already has a very good agreement with the simulated 2D SPL curve, the model can be refined further by making the slope between $D=L_2/6$ and $D=L_2$ a function of the ratio $(L_2/L_1)$. From the simulations, this slope (in dB per distance doubling) can be linearized between (at least) $0.1\leq(L_2/L_1)\leq1$ as:

$$\text{slope} = -1.6\times(L_2/L_1) - 2.5 \text{ (dB per distance doubling).}$$

This results in the following modified 2D model:

$$g=\begin{cases}(L_1\times\max(L_2, L_1/6))^{-0.25}\times(L_2)^{-0.5-x}\times(L_2/6)^{x+0.125}\times D^{-0.125}; & D<(L_2/6)\\(L_1\times\max(L_2, L_1/6))^{-0.25}\times(L_2)^{-0.5-x}\times D^{x}; & (L_2/6)\leq D<L_2\\(L_1\times\max(L_2, L_1/6))^{-0.25}\times D^{-0.5}; & L_2\leq D<\max(L_2, L_1/6)\\(L_1)^{-0.25}\times D^{-0.75}; & \max(L_2, L_1/6)\leq D<L_1\\D^{-1}; & D\geq L_1\end{cases} \quad \text{(Eq. 17)}$$

Around $D=L_2/6$, a "soft knee" is visible in the SPL curve, with the slope clearly increasing beyond this distance.

The behavior for $(L_2/6)<D<L_2$ depends on the ratio between $L_1$ and $L_2$. As described above, for a source that is much larger in dimension 1 than in dimension 2 the slope of the SPL curve at $D=L_2$ will be about −3 dB per distance doubling, whereas for a square source it will be −6 dB per distance doubling, while the slope for distances below $D=L_2/6$ is similar for both sources.

Figure 14:
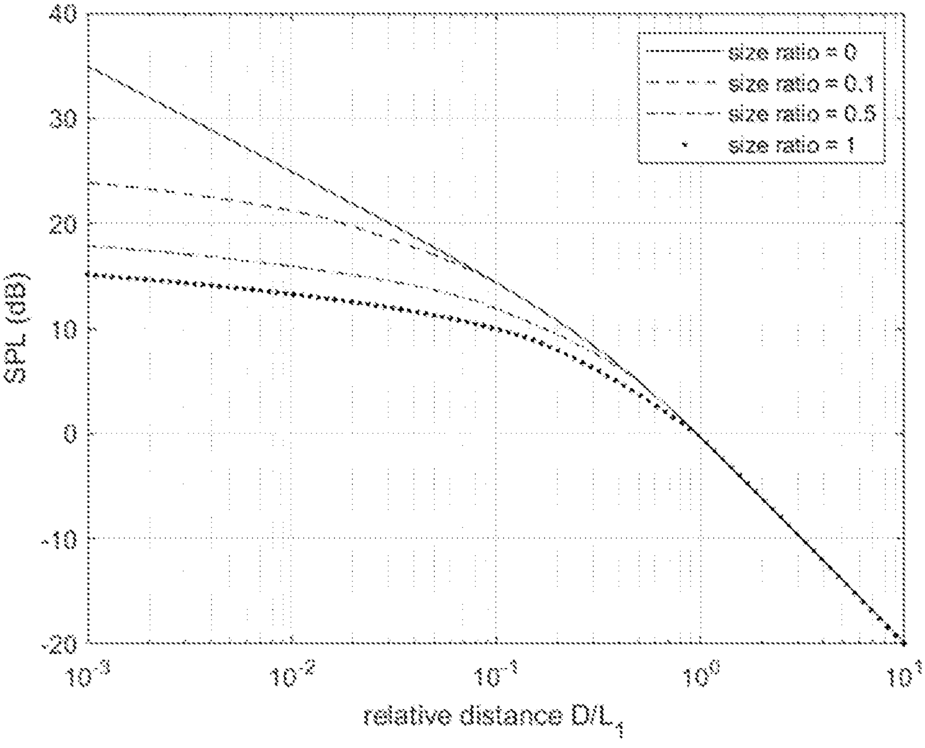
FIG. 14 shows SPL as function of relative distance for several different size ratios.

An important note is that the above observations from the 2D simulations were independent of the absolute size of the 2D source, i.e. the shape of the SPL curve of the 2D source is fully determined by the ratio $(L_2/L_1)$. Also, increasing or decreasing the absolute size of the 2D source by a factor x while keeping the ratio $(L_2/L_1)$ the same simply results in a corresponding shift of the SPL curve along the distance axis. In other words, when plotting the SPL curve as a function of the relative distance $D/L_1$ the curve is independent of the absolute size of the source. FIG. 14 shows the SPL as function of relative distance for size ratios of 0, 0.1, 0.5 and 1.

Summarizing the observations from the simulations as described above, the diffuse 2D model can be constructed as follows:

$$g=\begin{cases}(L_1\times\max(L_2, L_1/6))^{-0.25}\times(L_2/6)^{-0.375}\times D^{-0.125}; & D<(L_2/6)\\(L_1\times\max(L_2, L_1/6))^{-0.25}\times D^{-0.5}; & (L_2/6)\leq D<\max(L_2, L_1/6)\\(L_1)^{-0.25}\times D^{-0.75}; & \max(L_2, L_1/6)\leq D<L_1\\D^{-1}; & D\geq L_1\end{cases}. \quad \text{(Eq. 16)}$$

where x=−slope/(20 log 2)=—slope/6.0, with the slope in dB per distance doubling as given above.

Another, simpler, variant of the 2D model is to use the 1D model corresponding to a source of length $L_1$ for $D>(L_2/6)$ and to apply a small constant slope of e.g. −0.5 dB per distance doubling for $D<(L_2/6)$, i.e.:

$$g=\begin{cases}(6^{0.667}\times L_1^{-0.5}\times L_2^{-0.417})\times D^{-0.083}; & D<(L_2/6)\\(6^{0.25}\times L_1^{-0.5})\times D^{-0.5}; & (L_2/6)\leq D<(L_1/6)\\(L_1^{-0.25})\times D^{-0.75}; & (L_1/6)\leq D<L_1\\D^{-1}; & D\geq L_1\end{cases}. \quad \text{(Eq. 18)}$$

$$g=\begin{cases}(6^{0.667}\times L_1^{-0.5}\times L_2^{-0.417})\times D^{-0.083}; & D<(L_2/6)\\(6^{0.25}\times L_1^{-0.5})\times D^{-0.5}; & (L_2/6)\leq D<(L_1/6)\\(L_1^{-0.25})\times D^{-0.75}; & (L_1/6)\leq D<L_1\\D^{-1}; & D\geq L_1\end{cases}$$

The magnitude of the error of this simple 2D model is only slightly higher as for the more complicated models of Eq.16 and Eq.17 (the maximum error again occurs around $D=(L_2/6)$ and is about 3 dB for a square source), while the advantage is that it is an extremely simple extension of the 1D model (only adding one constant-slope segment to it for distances very close to the source).

If it is desired to minimize the magnitude of the error, the simple model of Eq.18 can be modified by replacing the largest dimension $L_1$ by $\sqrt{L_1^2+L_2^2}$ in the equation, which reduces the maximum error around $D=(L_2/6)$ at the expense of adding a small error (order of 1 dB) at extremely small distances.

It should be noted that application of the 2D model as described here is not limited to actual two-dimensional (i.e. flat) sound sources. More generally the model can be applied to 3D volumetric sound sources, where the 2D model is applied to a 2D projection of the 3D volumetric source relative to the listener position, and the sizes $L_1$ and $L_2$ in the 2D model are the sizes of this 2D projection. So, in the case of a 3D volumetric source the sizes $L_1$ and $L_2$ that are used as input to the 2D model are sizes of two orthogonal dimensions (e.g. width and height) of a 2D projection of the 3D source and are therefore dynamic functions of the listener position.

The 2D projection relative to the listener position may e.g. be a 2D planar projection that is orthogonal to the line from the listener position to a reference point of the 3D volumetric source. The reference point may e.g. be the closest point of the 3D volumetric source relative with respect to the current listener position, a geometrical center point of the 3D volumetric source, a notional position of the 3D volumetric source (e.g. a source position as provided in metadata of the 3D volumetric source), or any other suitable point on or within the 3D sound source. The 2D projection may be made such that it passes through the reference point, i.e. its distance to the listener position is the distance of the reference point to the listener position. The distance D that is input to the 2D distance model may be the distance from the listener position to the same reference point, or to another suitable reference point (of any of the types mentioned before) on or within the 3D sound source.

10. Example Implementation

Figure 8:
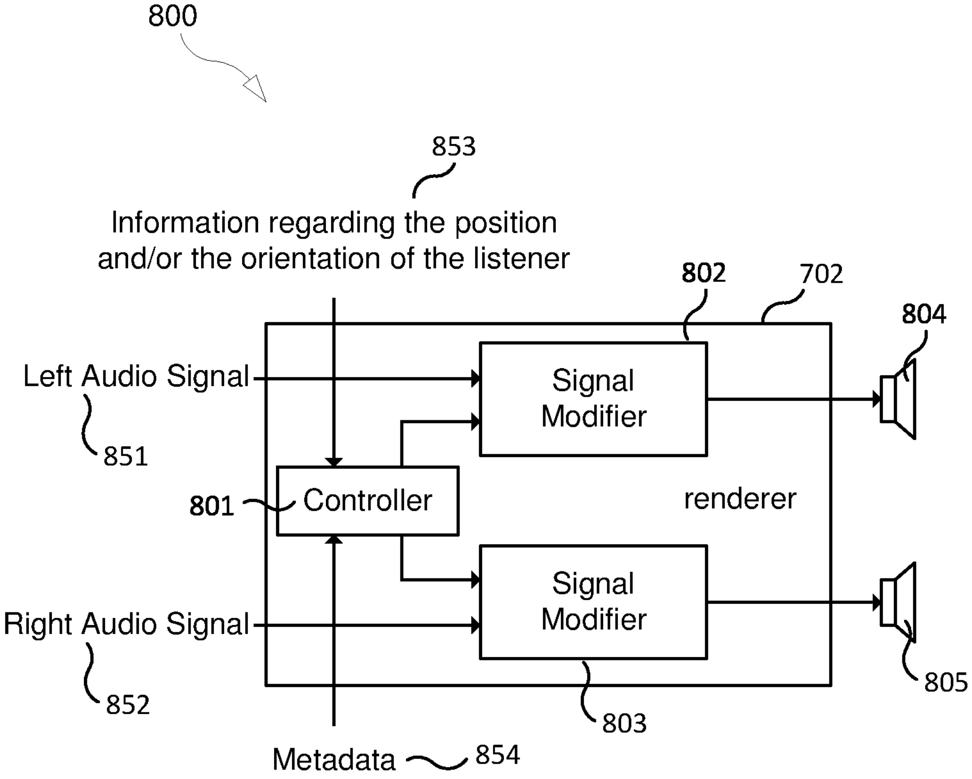
FIG. 8 illustrates a sound producing system according to some embodiments.

FIG. 8 shows an example system 800 for producing sound a for a XR scene. System 800 includes a controller 801, a signal modifier 802 for a left audio signal 851, a signal modifier 803 for a right audio signal 852, a speaker 804 for left audio signal 851, and a speaker 805 for right audio signal 852. Left audio signal 851 and right audio signal 852. While two audio signals, two modifiers, and two speakers are shown in FIG. 8, this is for illustration purpose only and does not limit the embodiments of the present disclosure in any way. Furthermore, even though FIG. 8 shows that system 800 receives and modifies left audio signal 851 and right audio signal 852 separately, system 800 may receive a mono signal.

Controller 801 may be configured to receive one or more parameters and to trigger modifiers 802 and 803 to perform modifications on left and right audio signals 851 and 852 based on the received parameters (e.g. increase or decrease the volume level in accordance with the a gain function describe herein). The received parameters are (1) information 853 regarding the position the listener (e.g., distance from an audio source) and (2) metadata 854 regarding the audio source, as described above.

Figure 9A:
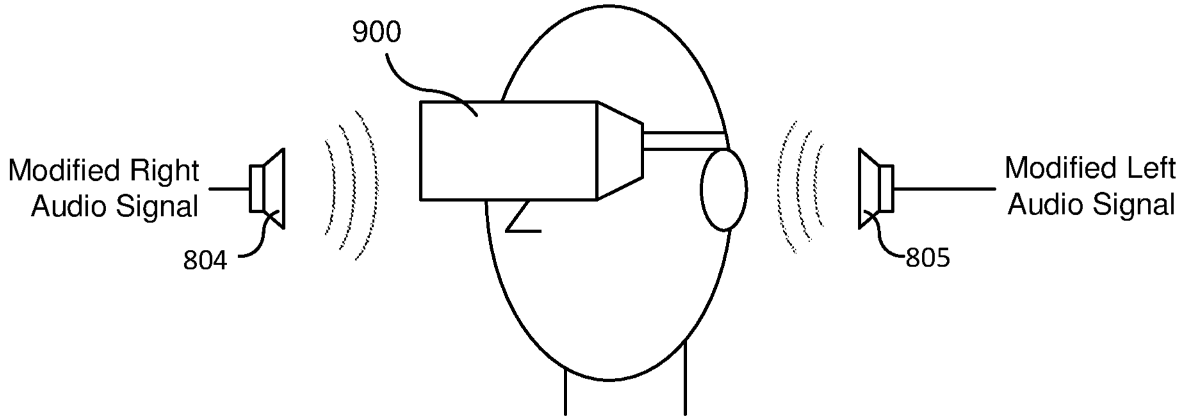
FIG. 9A illustrates use of an XR system according to some embodiments.
Figure 9B:
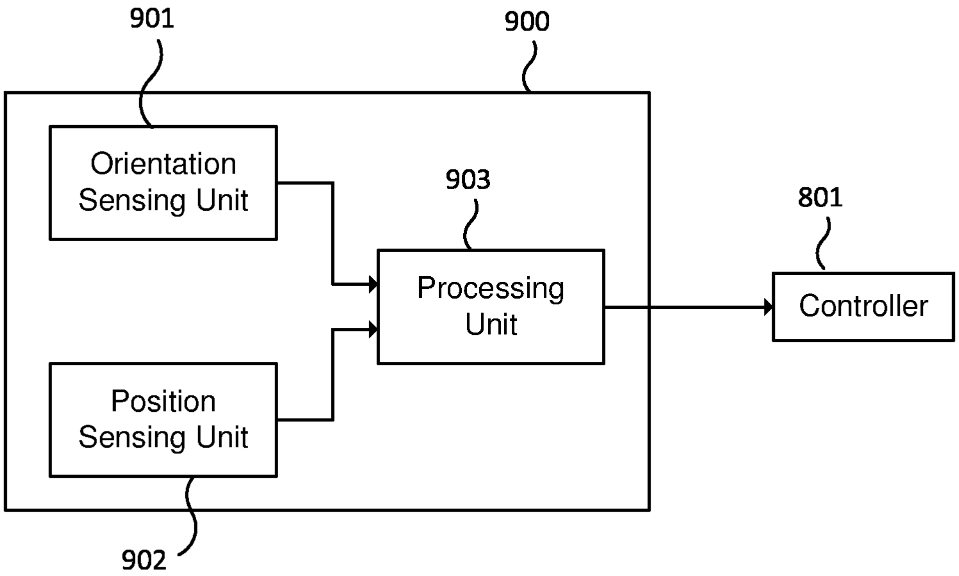
FIG. 9B illustrates components of the XR system according to some embodiments.

In some embodiments of this disclosure, information 853 may be provided from one or more sensors included in an XR system 900 illustrated in FIG. 9A. As shown in FIG. 9A, XR system 900 is configured to be worn by a user. As shown in FIG. 9B, XR system 900 may comprise an orientation sensing unit 901, a position sensing unit 902, and a processing unit 903 coupled to controller 801 of system 800. Orientation sensing unit 901 is configured to detect a change in the orientation of the listener and provides information regarding the detected change to processing unit 903. In some embodiments, processing unit 903 determines the absolute orientation (in relation to some coordinate system) given the detected change in orientation detected by orientation sensing unit 901. There could also be different systems for determination of orientation and position, e.g. the HTC Vive system using lighthouse trackers (lidar). In one embodiment, orientation sensing unit 901 may determine the absolute orientation (in relation to some coordinate system) given the detected change in orientation. In this case the processing unit 903 may simply multiplex the absolute orientation data from orientation sensing unit 901 and the absolute positional data from position sensing unit 902. In some embodiments, orientation sensing unit 901 may comprise one or more accelerometers and/or one or more gyroscopes.

Figure 10:
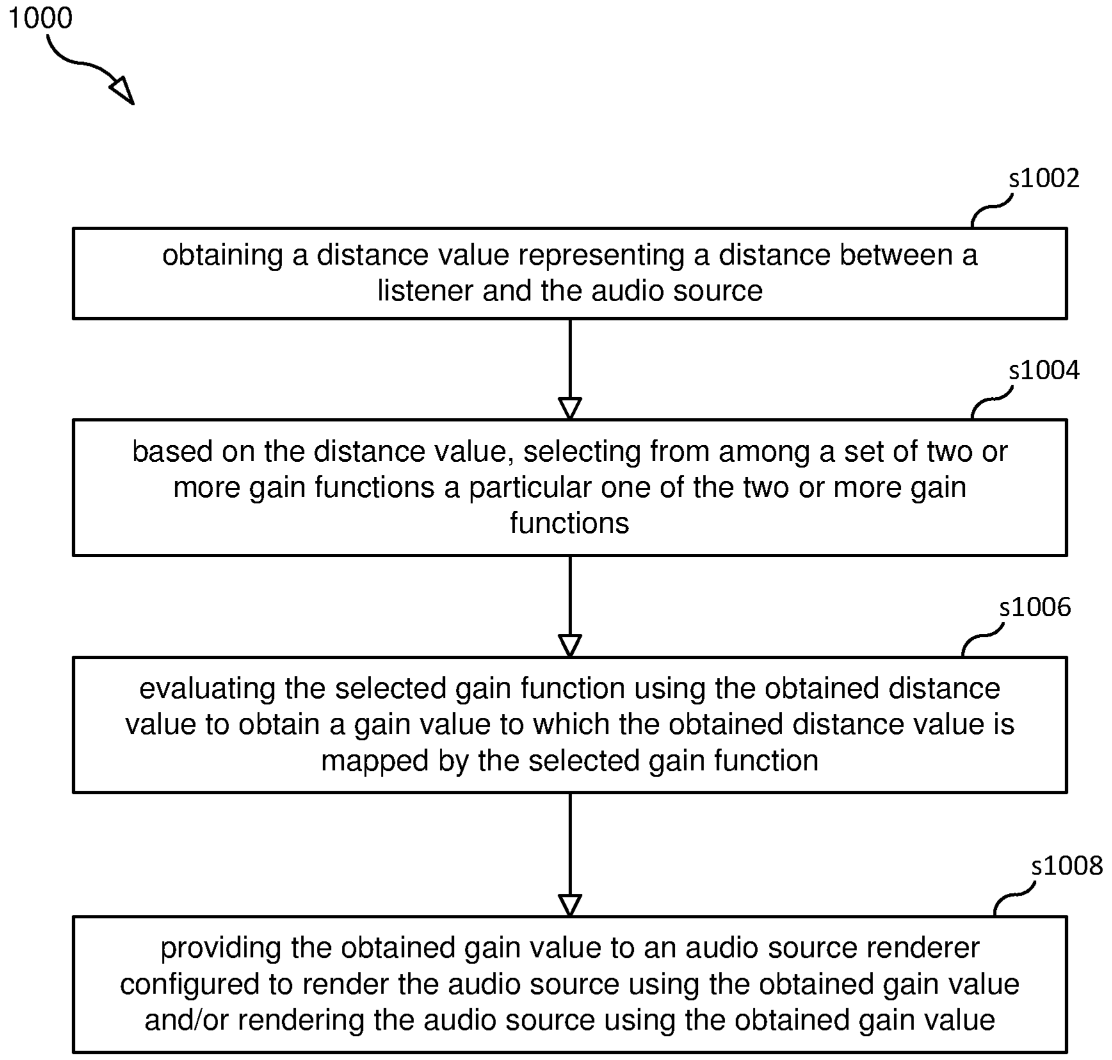
FIG. 10 is a flowchart illustrating a process according to some embodiments.

FIG. 10 is a flow chart illustrating a process 1000 according, to one embodiment, for rendering an audio source. Process 1000 may begin in step s1002 and may be performed by renderer 702 or encoder 701.

Step s1002 comprises obtaining a distance value (D) representing a distance between a listener and the audio source.

Step s1004 comprises, based on the distance value (e.g., based at least in part on the distance value and a first threshold), selecting from among a set of two or more gain functions a particular one of the two or more gain functions (e.g., selecting the function $-10\log_{10}(D_t)-10\log_{10}(D)$ if D is less than a threshold, otherwise selecting the function $-20\log_{10}(D)$ as shown in equation 5). In some embodiments, the set of two or more gain functions comprises a first gain function and a second gain function, the first gain function is a first linear function on a logarithmic (decibel) scale, and the second gain function is a second linear function on a logarithmic (decibel) scale.

Step s1006 comprises evaluating the selected gain function using the obtained distance value to obtain a gain value (G) to which the obtained distance value (D) is mapped by the selected gain function (e.g., calculating $G=-10\log_{10}(Dr)-10\log_{10}(D)$ or using a lookup table that maps D values to G values according to $G=-10\log_{10}(D_t)-10\log_{10}(D)$).

Step s1008 comprises providing the obtained gain value to audio renderer 702 configured to render the audio source using the obtained gain value and/or rendering the audio source using the obtained gain value.

Figure 11:
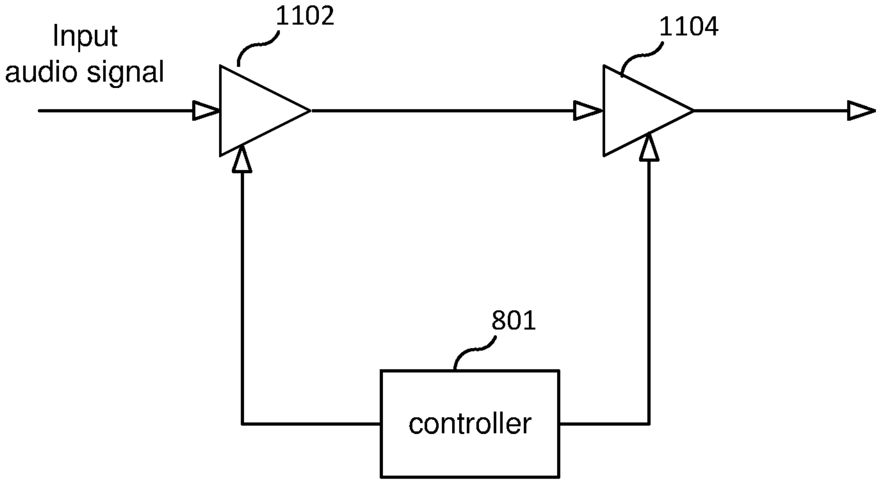
FIG. 11 illustrates the use of shows two signal level adjusters.

In some embodiments, rendering the audio source using the obtained gain value comprises: setting a volume level of an audio signal associated with the audio source based on a point-source gain value; and adjusting the volume level of the audio signal using the obtained gain value. This feature is illustrated in FIG. 11, which shows two signal level adjusters (e.g., amplifiers): signal level adjuster 1102 and signal level adjuster 1104. In one embodiment, controller 801 controls signal level adjuster 1102 based on a point-source gain value (Gp) (e.g., $Gp=-20\log_{10}(D)$) and controller 801 controls signal level adjuster 1104 based on the obtained gain value (e.g., $Gnorm=-5\log_{10}(D_1D_2)+10\log_{10}(D)$ as shown in equation 8). Thus, in one embodiment, process 1000 further includes determining the point-source gain value based on the distance value, wherein the point-source gain value on a logarithmic (decibel) scale varies as function of distance D as: $-20 \log_{10}(D)$.

In one embodiment, the set of gain functions comprises at least a first gain function and a second gain function, and selecting a particular one of the two or more gain functions based on the distance value comprises: comparing D to a first threshold; and, if, based on the comparison, it is determined that D is not greater than the first threshold, then selecting the first gain function. In some embodiments the audio source has an associated length (L), and the first threshold is a function of the associated length. In some embodiments the first threshold is equal to: (k)(L), where k is a predetermined constant (e.g., k=1/6 or $k=1/6^{1/2}$). In some embodiments the first threshold is proportional to $L^2$, where L is the associated length.

In some embodiments, the step of selecting a particular one of the two or more gain functions based on the distance value further comprises selecting the second gain function if, based on the comparison, it is determined that the distance value is greater than the first threshold. In some embodiments, the second gain function is a constant function.

In some embodiments, the set of gain functions further comprises a third gain function, and the step of selecting a particular gain function based on the distance value further comprises: comparing the distance value to a second threshold; and if, based on the comparisons, it is determined that the distance value is greater than the first threshold but not greater than the second threshold, then selecting the second gain function. In some embodiments, the step of selecting a particular gain function based on the distance value further comprises selecting the third gain function if, based on the comparison, it is determined that the distance value is greater than the second threshold. The third gain function may be a constant function (e.g., G=0 dB or G=1 on a linear gain scale).

In some embodiments, evaluating the selected gain function using the obtained distance value to obtain the gain value (G) comprises evaluating the selected gain function using the distance value and a frequency value such that the obtained gain value is associated with the frequency value (e.g., calculating $G=-10 \log_{10}(f)-20 \log_{10}(L/a)-10 \log_{10}(D)$ as shown in equation 11). In some embodiments, process 1000 also includes determining the first threshold based on the frequency value. For example, the first threshold may be proportional to: $fL^2/k$, where f is the frequency value, L is a length of the audio source, k is a predetermined constant.

In some embodiments process 1000 is performed by renderer 702 and further comprises: obtaining scene configuration information, the scene configuration information comprising metadata for the audio source, wherein the metadata for the audio source comprises: i) geometry information specifying a geometry of the audio source (e.g., specifying a length of the audio source) and ii) an indicator (e.g., a flag) indicating whether or not the audio source renderer should apply an additional gain based on the obtained gain value when rendering the audio source. In some embodiments, the metadata for the audio source further comprises at least one of: i) an indicator indicating that the audio source renderer should determine the additional gain based on the geometry information, ii) an indicator indicating that the audio source renderer should determine the additional gain without using the geometry information, iii) coherence behavior information indicating a coherence behavior of the audio source, iv) information indicating a frequency at which the audio source transitions from a coherent audio source to a diffuse audio source, v) information indicating a frequency-dependent degree of coherence for the audio source, vi) gain curve information indicating each gain function included in the set of two or more gain functions, vii) the parameter value that enable renderer 702 to derive corresponding distance-dependent gains from a parametric model, or viii) a table that maps a set of distance (D) values to a set of gain values.

Figure 12:
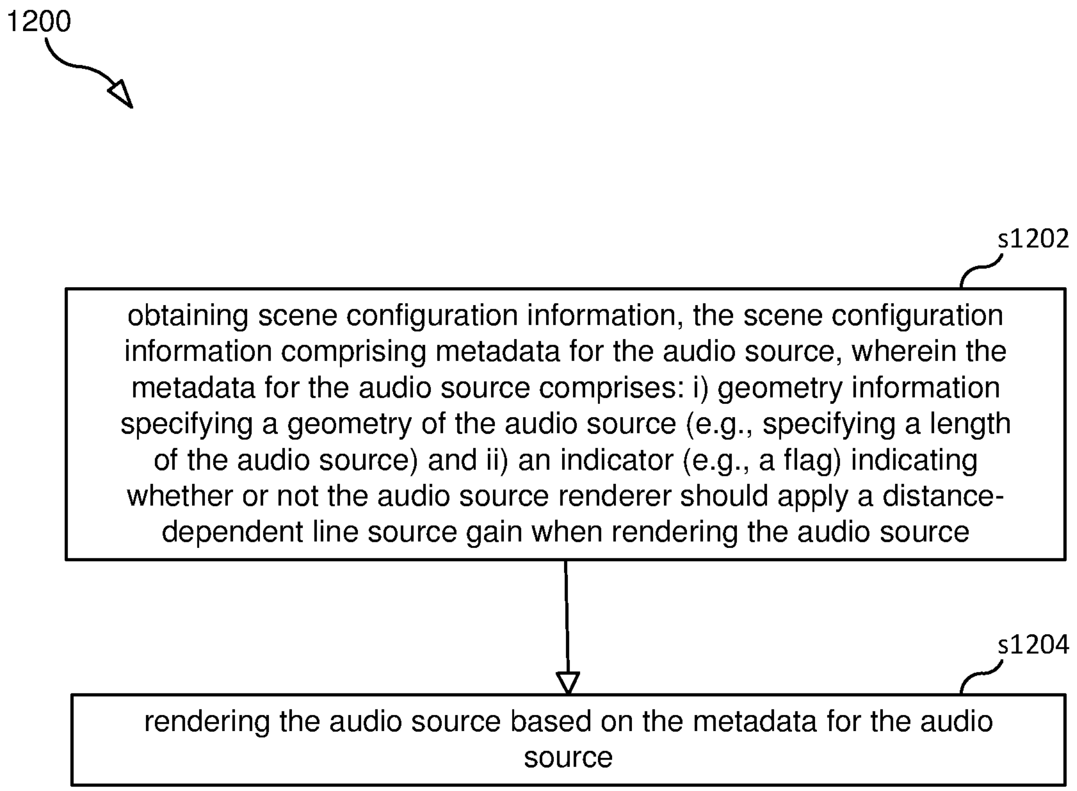
FIG. 12 is a flowchart illustrating a process according to some embodiments.

FIG. 12 is a flow chart illustrating a process 1200 according, to one embodiment, for rendering an audio source in a computer generated scene. Process 1200 may begin in step s1202 and may be performed by renderer 702. Step s1202 comprises obtaining scene configuration information, the scene configuration information comprising metadata for the audio source, wherein the metadata for the audio source comprises: i) geometry information specifying a geometry of the audio source (e.g., specifying a length of the audio source) and ii) an indicator (e.g., a flag) indicating whether or not the audio source renderer should apply an additional gain based on a gain value obtained based on a distance value that represents a distance between a listener and the audio source when rendering the audio source. Steps s1204 comprises rendering the audio source based on the metadata for the audio source.

In some embodiments process 1200 further includes obtaining the distance value; and obtaining the gain value based on the obtained distance value, wherein obtaining the gain value based on the obtained distance value comprises selecting from among a set of two or more gain functions a particular one of the two or more gain functions; and evaluating the selected gain function using the obtained distance value to obtain a particular gain value to which the obtained distance value is mapped by the selected gain function, wherein rendering the audio source based on the metadata for the audio source comprises applying an additional gain based on the obtained particular gain value.

Figure 13:
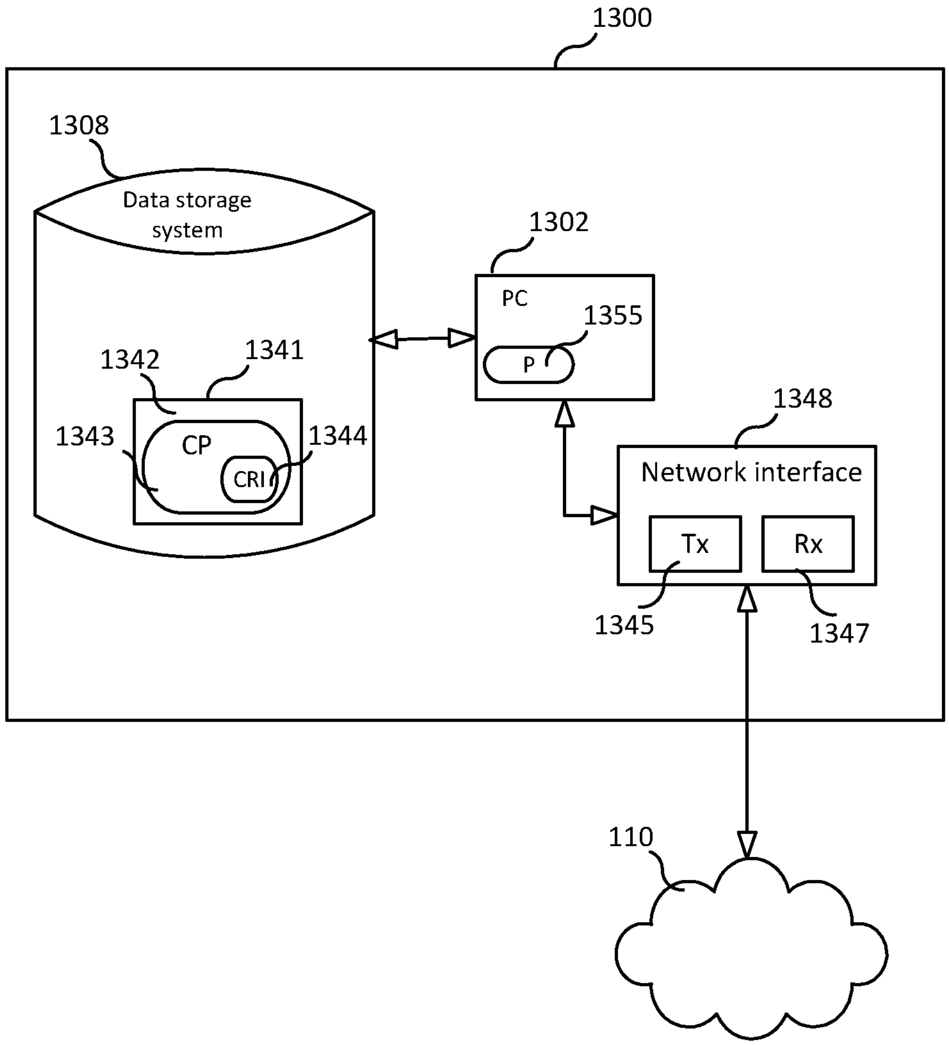
FIG. 13 is a block diagram of an apparatus according to some embodiments.

FIG. 13 is a block diagram of an apparatus 1300, according to some embodiments, for implementing system 800 shown in FIG. 8. As shown in FIG. 13, apparatus 1300 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1300 may be a distributed computing apparatus); at least one network interface 1348, were each network interface 1348 comprises a transmitter (Tx) 1345 and a receiver (Rx) 1347 for enabling apparatus 1300 to transmit data to and receive data from other nodes connected to a network 110 (e.g., an Internet Protocol (IP) network) to which network interface 1348 is connected (directly or indirectly) (e.g., network interface 1348 may be wirelessly connected to the network 110, in which case network interface 1348 is connected to an antenna arrangement); and one or more storage units (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes apparatus 1300 to perform steps described herein (e.g., steps described herein with reference to the flow charts). In other embodiments, apparatus 1300 may be configured to perform steps described herein without the need for code. That is, for example, PC 1302 may consist merely of one or more ASICs. Hence, the features of the embodiments described herein may be implemented in hardware and/or software.

The following is a summary of various embodiments described herein

A1. A method for rendering an audio source, the method comprising: obtaining a distance value representing a distance between a listener and the audio source; based on the distance value, selecting from among a set of two or more gain functions a particular one of the two or more gain functions; evaluating the selected gain function using the obtained distance value to obtain a gain value to which the obtained distance value is mapped by the selected gain function; and providing the obtained gain value to an audio source renderer configured to render the audio source using the obtained gain value and/or rendering the audio source using the obtained gain value.

Point-Source Normalization: A2. The method of embodiment A1, wherein rendering the audio source using the obtained gain value comprises: setting a volume level of an audio signal associated with the audio source based on a point-source gain value; and adjusting the volume level of the audio signal using the obtained gain value.

A3. The method of embodiment A2, further comprising determining the point-source gain value based on the distance value, wherein the point-source gain value on a logarithmic (decibel) scale varies as function of distance as $-20 \log_{10}(D)$, where D is the distance value.

A4. The method of any one of embodiments A1-A3, wherein the set of gain functions comprises at least a first gain function and a second gain function, and selecting a particular one of the two or more gain functions based on the distance value comprises: comparing the distance value to a first threshold; and if, based on the comparison, it is determined that the distance value is not greater than the first threshold, then selecting the first gain function.

A5. The method of embodiment A4, wherein the step of selecting a particular one of the two or more gain functions based on the distance value further comprises selecting the second gain function if, based on the comparison, it is determined that the distance value is greater than the first threshold.

A6. The method of embodiment A4 or A5, wherein the second gain function is a constant function.

A7. The method of embodiment A4, wherein the set of gain functions further comprises a third gain function, and the step of selecting a particular gain function based on the distance value further comprises: comparing the distance value to a second threshold; and if, based on the comparisons, it is determined that the distance value is greater than the first threshold but not greater than the second threshold, then selecting the second gain function.

A8. The method of embodiment A7, wherein the step of selecting a particular gain function based on the distance value further comprises selecting the third gain function if, based on the comparison, it is determined that the distance value is greater than the second threshold.

A9. The method of embodiment A7 or A8, wherein the third gain function is a constant function.

A10. The method of any one embodiments A1-A9, wherein evaluating the selected gain function using the obtained distance value to obtain the gain value comprises evaluating the selected gain function using the obtained distance value and a frequency value such that the obtained gain value is associated with the frequency value.

A11. The method of embodiment A10, further comprising determining the first threshold based on the frequency value.

A12. The method of embodiment A10 or A11, wherein the first threshold is proportional to: $fL^2$, where f is the frequency value and L is a length of the audio source.

A13. The method of any one of embodiments A1-A12, wherein the method is performed by the audio source renderer and further comprises: obtaining scene configuration information, the scene configuration information comprising metadata for the audio source, wherein the metadata for the audio source comprises: i) geometry information specifying a geometry of the audio source (e.g., specifying a length of the audio source) and ii) an indicator (e.g., a flag) indicating whether or not the audio source renderer should apply an additional gain based on the obtained gain value when rendering the audio source.

A14. The method of embodiments A13, wherein the metadata for the audio source further comprises at least one of: an indicator indicating that the audio source renderer should determine the additional gain based on the geometry information, an indicator indicating that the audio source renderer should determine the additional gain without using the geometry information, coherence behavior information indicating a coherence behavior of the audio source, information indicating a frequency at which the audio source transitions from a coherent audio source to a diffuse audio source, information indicating a frequency-dependent degree of coherence for the audio source, gain curve information indicating each gain function included in the set of two or more gain functions, the parameter value that enable the audio source renderer to derive corresponding distance-dependent gains from a parametric model, or a table that maps a set of distance values to a set of gain values.

A15. The method of any one of embodiments A4-A14, wherein the audio source has an associated length (L), and the first threshold is a function of the associated length.

A16. The method of embodiments A15, wherein the first threshold is equal to: (k)(L), where k is a predetermined constant.

A17. The method of embodiments A16, wherein $k=1/6$ or $k=1/6^{1/2}$

A18. The method of embodiments A15, wherein the first threshold is proportional to $L^2$, A19. The method of any one of embodiments A1-A18, wherein the set of two or more gain functions comprises a first gain function and a second gain function, the first gain function is a first linear function on a logarithmic (decibel) scale, and the second gain function is a second linear function on a logarithmic (decibel) scale.

B1. A method for rendering an audio source in a computer generated scene, the method being performed by an audio source renderer and comprising: obtaining scene configuration information, the scene configuration information comprising metadata for the audio source, wherein the metadata for the audio source comprises: i) geometry information specifying a geometry of the audio source (e.g., specifying a length of the audio source) and ii) an indicator (e.g., a flag) indicating whether or not the audio source renderer should apply an additional gain based on a gain value obtained based on a distance value that represents a distance between a listener and the audio source when rendering the audio source; and rendering the audio source based on the metadata for the audio source.

B2. The method of embodiment B1, further comprising: obtaining the distance value; and obtaining the gain value based on the obtained distance value, wherein obtaining the gain value based on the obtained distance value comprises selecting from among a set of two or more gain functions a particular one of the two or more gain functions; and evaluating the selected gain function using the obtained distance value to obtain a particular gain value to which the obtained distance value is mapped by the selected gain function, wherein rendering the audio source based on the metadata for the audio source comprises applying an additional gain based on the obtained particular gain value.

C1. A computer program comprising instructions which when executed by processing circuitry causes the processing circuitry to perform the method of any one of the above embodiments.

C2. A carrier containing the computer program of embodiment C1, wherein the carrier is one of an electronic signal, an optical signal, a radio signal, and a computer readable storage medium.

D1. An apparatus, the apparatus being adapted to perform the method of any one of the embodiments disclosed above.

E1. An apparatus, the apparatus comprising: processing circuitry; and a memory, said memory containing instructions executable by said processing circuitry, whereby said apparatus is adapted to perform the method of any one of the embodiments disclosed above.

While various embodiments are described herein (including the Appendices, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] M. Ureda, 'Pressure response of line sources', paper 5649 presented at the 113th AES Convention, 2002.

[2] ISO/IEC 23008-3:201x(E) (MPEG-H), Clause 8.4.4.7 ('Spreading'), Clause 18.1 ('Divergence'), Clause 18.11 ('Diffuseness').

The invention claimed is:

1. A method for rendering an audio source in a computer generated scene, wherein the audio source has an extent, the method being performed by an audio source renderer and comprising:

obtaining scene configuration information comprising metadata for the audio source, wherein the metadata for the audio source comprises:

i) geometry information specifying a geometry of the extent of the audio source, and ii) an indicator indicating that a distance-dependent gain should be derived taking a size of the extent of the audio source into account; and rendering the audio source based on the metadata for the audio source.

2. The method of claim 1, wherein the method further comprises:

obtaining a distance value that represents a distance between a listening position and a reference point; and obtaining a gain value using the obtained distance value.

3. The method of claim 2, wherein obtaining the gain value using the obtained distance value comprises:

selecting from among a set of two or more gain functions a particular one of the two or more gain functions; and evaluating the selected gain function using the obtained distance value to obtain a particular gain value to which the obtained distance value is mapped by the selected gain function, and rendering the audio source based on the metadata for the audio source comprises applying a gain based on the obtained particular gain value.

4. The method of claim 1, wherein the geometry information comprises length information specifying a length of the extent of the audio source.

5. The method of claim 2, wherein the reference point is a point on the extent that is closest to the listening position, the distance value that represents the distance between a listening position and the reference point is X units of distance, and X is greater than 0.

6. The method of claim 1, wherein rendering the audio source based on the metadata for the audio source comprises:

determining that the indicator indicates that the distance-dependent gain should be derived taking the size of the extent of the audio source into account;

as a result of determining that the indicator indicates that the distance-dependent gain should be derived taking the size of the extent of the audio source into account, deriving the distance-dependent gain using information indicating the size of the extent of the audio source; and rendering the audio source using the derived distance-dependent gain.

7. The method of claim 3, wherein evaluating the selected gain function using the obtained distance value comprises:

evaluating the selected gain function using the obtained distance value and a first size value indicating a first size of the extent of the audio source.

8. The method of claim 3, wherein evaluating the selected gain function using the obtained distance value comprises:

evaluating the selected gain function using the obtained distance value, a first size value (L1) indicating a first size of the extent of the audio source, and a second size value (L2) indicating a second size of the extent of the audio source.

9. A non-transitory computer readable medium storing instructions which when executed by processing circuitry of an apparatus causes the apparatus to perform the method of claim 1.

10. An apparatus, the apparatus comprising:

processing circuitry; and a non-transitory computer readable medium storing instructions which when executed by the processing circuitry causes the apparatus to perform a method for rendering an audio source in a computer generated scene, wherein the audio source has an extent, the method comprising:

obtaining scene configuration information comprising metadata for the audio source, wherein the metadata for the audio source comprises:

i) geometry information specifying a geometry of the extent of the audio source, and ii) an indicator indicating that a distance-dependent gain should be derived taking a size of the extent of the audio source into account; and rendering the audio source based on the metadata for the audio source.

11. The apparatus of claim 10, wherein the method further comprises:

obtaining a distance value that represents a distance between a listening position and a reference point; and obtaining a gain value using the obtained distance value.

12. The apparatus of claim 11, wherein obtaining the gain value using the obtained distance value comprises:

selecting from among a set of two or more gain functions a particular one of the two or more gain functions; and evaluating the selected gain function using the obtained distance value to obtain a particular gain value to which the obtained distance value is mapped by the selected gain function, and rendering the audio source based on the metadata for the audio source comprises applying a gain based on the obtained particular gain value.

13. The apparatus of claim 10, wherein the geometry information comprises length information specifying a length of the extent of the audio source.

14. The apparatus of claim 11, wherein the reference point is a point on the extent that is closest to the listening position, the distance value that represents the distance between a listening position and the reference point is X units of distance, and X is greater than 0.

* * * * *